(12) United States Patent
Tsuda et al.

(10) Patent No.: US 7,557,857 B2
(45) Date of Patent: Jul. 7, 2009

(54) QUANTITY-OF-LIGHT ADJUSTING APPARATUS

(75) Inventors: Yuji Tsuda, Kawasaki (JP); Kunihiko Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 11/147,084

(22) Filed: Jun. 7, 2005

(65) Prior Publication Data

US 2005/0225662 A1   Oct. 13, 2005

Related U.S. Application Data

(62) Division of application No. 09/613,741, filed on Jul. 11, 2000, now Pat. No. 6,930,723.

(30) Foreign Application Priority Data

Jul. 13, 1999 (JP) .................. 11-199533

(51) Int. Cl.
H04N 5/235 (2006.01)
H04N 5/225 (2006.01)
G03B 7/24 (2006.01)

(52) U.S. Cl. .................... 348/360; 348/342; 348/229.1; 348/362; 396/209

(58) Field of Classification Search .............. 348/229.1, 348/342, 360, 363
See application file for complete search history.

(56) References Cited

U.S. PATENT DOCUMENTS

| 4,396,951 A | 8/1983 | Tanaka |
| 4,794,418 A | 12/1988 | Kabayashi et al. |
| 4,827,348 A | 5/1989 | Ernest et al. |
| 4,855,814 A | 8/1989 | Shiraishi et al. |
| 5,083,209 A | 1/1992 | Inoue et al. |
| 5,387,958 A | 2/1995 | Pashley |
| 5,455,685 A | * 10/1995 | Mori ......................... 348/366 |
| 5,483,280 A | 1/1996 | Takahashi et al. |
| 5,638,123 A | 6/1997 | Yamaguchi |
| 5,825,417 A | 10/1998 | Yoshida |
| 6,356,304 B1 | 3/2002 | Kawaguchi et al. |

FOREIGN PATENT DOCUMENTS

| EP | 0804021 | 10/1997 |
| JP | 63-195315 | 12/1988 |
| JP | 04-372935 | 12/1992 |
| JP | 05-219431 | 8/1993 |
| JP | 06-292069 | 10/1994 |
| JP | 09-098322 | 4/1997 |
| JP | 09098322 | * 4/1997 |

(Continued)

*Primary Examiner*—Nhan T Tran
(74) *Attorney, Agent, or Firm*—Cowan, Liebowitz & Latman, P.C.

(57) ABSTRACT

In a quantity-of-light adjusting apparatus having an iris and an ND filter which limit incident light, a control method for the quantity-of-light adjusting apparatus, and a computer program product providing a control program for the quantity-of-light adjusting apparatus, a state of limitation of the incident light by the iris is changed at a first changing speed, and, when a state of limitation of the incident light by the ND filter is changed, the state of limitation of the incident light by the iris is changed at a second changing speed different from the first changing speed.

3 Claims, 27 Drawing Sheets

FOREIGN PATENT DOCUMENTS

| | | |
|---|---|---|
| JP | 09-331474 | 12/1997 |
| JP | 10-376340 | 10/1998 |
| JP | 11-064921 | 3/1999 |
| JP | 11-084459 | 3/1999 |
| JP | 11-095126 | 4/1999 |
| JP | 11-202398 | 7/1999 |

* cited by examiner

IN THE CASE OF PRIOR ART

IN THE CASE OF INVENTION

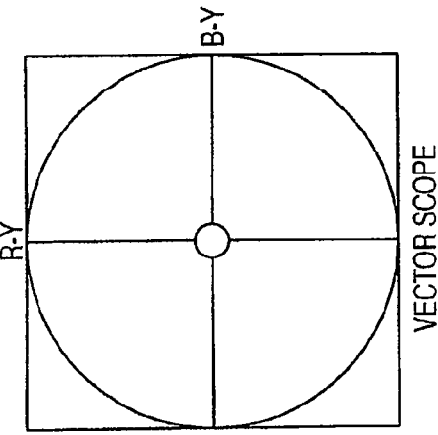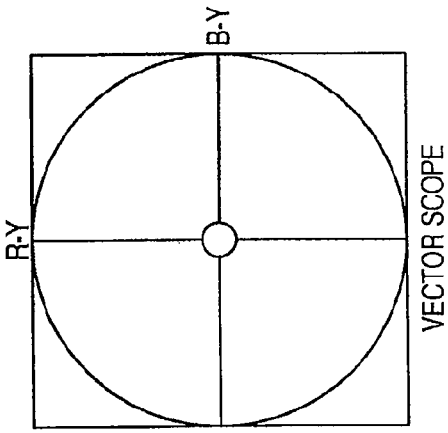
FIG.26(a) (PRIOR ART) 5600K WB MODE WHEN ND FILTER IS OFF
FIG.26(b) (PRIOR ART) 5600K WB MODE WHEN ND FILTER IS ON
FIG.26(c) (PRIOR ART) 3200K WB MODE WHEN ND FILTER IS OFF
FIG.26(d) (PRIOR ART) 3200K WB MODE WHEN ND FILTER IS ON

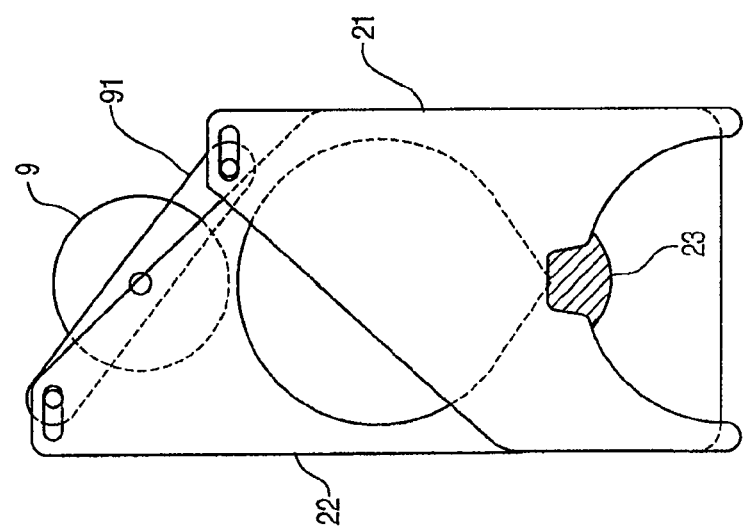
FIG.28(a) (PRIOR ART)  FIG.28(b) (PRIOR ART)  FIG.28(c) (PRIOR ART)
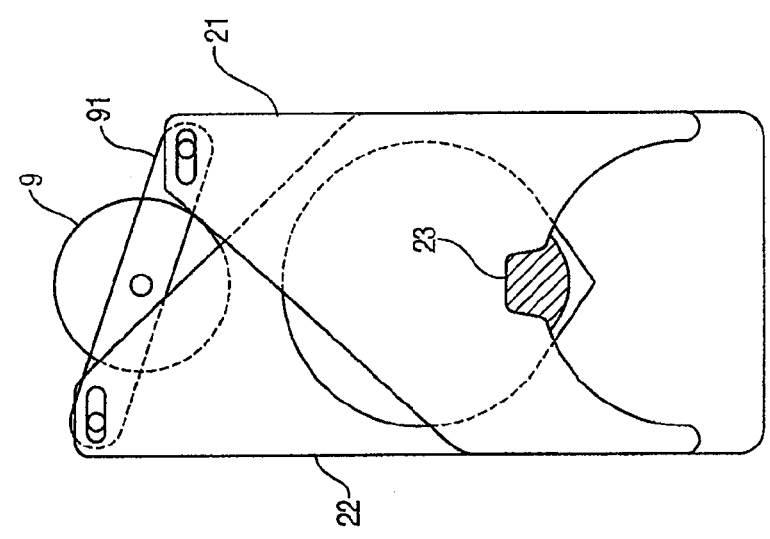
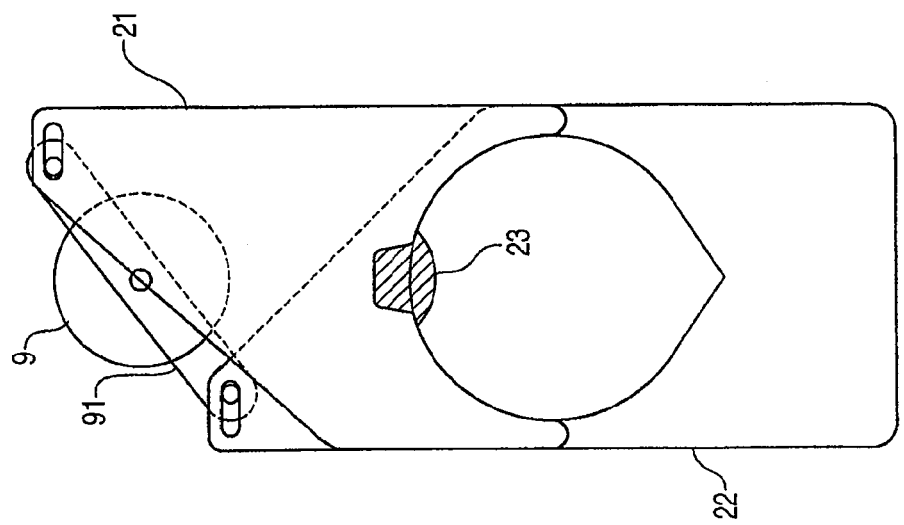

QUANTITY-OF-LIGHT ADJUSTING APPARATUS

This application is a divisional of application Ser. No. 09/613,741, filed Jul. 11, 2000, now U.S. Pat. No. 6,930,723, the entire disclosure of which is hereby incorporated by reference.

BACKGROUND OF THE INVENTION

1. Field of the Invention

The present invention relates to a quantity-of-light adjusting apparatus for an image pickup apparatus or the like using an ND (neutral-density) filter, a control method for the quantity-of-light adjusting apparatus, and a computer program product providing a control program for the quantity-of-light adjusting apparatus.

2. Description of Related Art

FIG. 21 is a block diagram showing the arrangement of an image pickup apparatus, such as a video camera, serving as a first example of prior art.

In FIG. 21, there are illustrated an image forming lens 501, an ND filter 502 for attenuating light, an iris 503 for adjusting the quantity of light, an image sensor 504, such as a CCD, a CDS/AGC circuit (correlated-double-sampling/automatic-gain-control circuit) 505, and a route 506 leading to a video signal processing circuit for forming a television signal.

There are further illustrated a luminance signal detecting circuit 507 for detecting a luminance signal from a video signal outputted from the CDS/AGC circuit 505, an iris control signal computing circuit 508 for forming a control signal for controlling the iris 503 according to luminance information outputted from the luminance signal detecting circuit 507, a driver 509 for driving the iris 503, and an ND-filter switching lever 510 for switching between the insertion and detachment of the ND filter 502.

Next, the operation of the image pickup apparatus shown in FIG. 21 is described.

As a luminance signal for use in controlling an exposure, there is used a luminance signal, including a high-frequency component, included in a video signal outputted from the CDS/AGC circuit 505. The luminance signal is detected by the luminance signal detecting circuit 507 and is, then, sent to the iris control signal computing circuit 508. The iris control signal computing circuit 508 computes an iris control signal by comparing the luminance signal with a predetermined reference value (a correct exposure level), in such a way as to make always constant the luminance signal detected by the luminance signal detecting circuit 507.

For example, with the comparison between the luminance signal detected by the luminance signal detecting circuit 507 and the above-mentioned reference value, if the luminance signal is not less than the reference value, such a control signal as to cause the iris 503 to operate in the closing direction is generated, and, if the luminance signal is less than the reference value, such a control signal as to cause the iris 503 to operate in the opening direction is generated. The control signal as generated is supplied to the iris 503 through the driver 509. The response at which the exposure is controlled by the iris 503 (the amount of change of exposure per unit time) is set always constant. If such a response is either too fast or too slow, the user would be given an unnatural feeling, so that the tuning of the response is said to be a difficult point.

Next, the operation for controlling the iris 503 is described with reference to the flow chart of FIG. 22.

First, a luminance signal, including a high-frequency component, included in a video signal outputted from the CDS/AGC circuit 505 is detected (step S601). Then, the detected luminance signal is compared with a predetermined reference value (a correct exposure level). If the luminance signal is not less than the reference value, such a control signal as to cause the iris 503 to operate in the closing direction is computed, and, if the luminance signal is less than the reference value, such a control signal as to cause the iris 503 to operate in the opening direction is computed (step S602). Then, the computed control signal is supplied to the iris 503 through the driver 509 (step S603).

Next, the ND filter 502 is described.

The user is allowed to operate the ND-filter switching lever 510 so as to insert and detach the ND filter 502 into and from an optical path of the lens 501, thereby selecting the use or nonuse of the ND filter 502. The basic usage of the ND filter 502 resides in that, with the ND filter 502 inserted when the luminance of an object is high, it is possible to prevent the so-called small-aperture diffraction phenomenon due to the iris 503, and, with the ND filter 502 detached when the luminance of an object is low, it is possible to increase the sensitivity of the image pickup operation.

Next, a second example of prior art is described.

Heretofore, a variety of proposals have been made about the white balance control in image pickup apparatuses, such as video cameras. In the following, the second example of prior art is described with regard to the white balance control having such a presetting function as an outdoor mode (5600K mode) or an indoor mode (3200K mode).

FIG. 23 is a block diagram showing an interchangeable-lens-type image pickup system according to the second example of prior art.

Referring to FIG. 23, the interchangeable-lens-type image pickup system is composed of a lens unit 113 and a camera body 114 on which the lens unit 113 is detachably mounted.

The lens unit 113 includes an image forming lens 101, an ND filter 102 for attenuating light, an iris 103 for adjusting the quantity of light, an ND-filter switching lever 112 for inserting and detaching the ND filter 102, and a lens microcomputer 111.

The camera body 114 includes an image sensor 104, such as a CCD, a CDS/AGC circuit 105, an A/D converter 106 for converting an analog video signal into a digital video signal, a camera signal processing circuit 107, a route 108 for outputting a television signal formed by the camera signal processing circuit 107, a camera microcomputer 109, a communication line 110 for communication between the camera microcomputer 109 and the lens microcomputer 111, and a WB mode selection switch 115 for allowing the user to select the WB (white balance) mode, such as the outdoor mode or the indoor mode.

The camera signal processing circuit 107 includes a luminance/chrominance signal forming circuit 120 for converting the digital video signal outputted from the A/D converter 106 into a high-frequency component YH of the luminance signal, a low-frequency component YL of the luminance signal and chrominance signals R and B, a gain control circuit 121 for the red signal R, a gain control circuit 122 for the blue signal B, a color-difference signal forming circuit 123 for forming color-difference signals R-Y and B-Y from the chrominance signals R' and B' gain-controlled by the gain control circuits 121 and 122 and the low-frequency component YL of the luminance signal, and an encoder 124 for forming the television signal from the color-difference signals R-Y and B-Y and the high-frequency component YH of the luminance signal.

Next, the operation of the interchangeable-lens-type image pickup system shown in FIG. 23 is described.

When the lens unit 113 is mounted on the camera body 114, electric power is supplied from the camera body 114 to the lens unit 113. Further, the user is allowed to operate the ND-filter switching lever 112 so as to insert and detach the ND filter 102 into and from an optical path of the lens 101, thereby selecting the use or nonuse of the ND filter 102.

Optical image light from an object is made to pass through the lens 101, and is then attenuated by the ND filter 102. Then, after being adjusted by the iris 103 so as to make a correct exposure, the optical image light is imaged on the image sensor 104. A video signal obtained by the photoelectric conversion at the image sensor 104 is subjected to the noise-removing and gain-control process at the CDS/AGC circuit 105, and is then converted into a digital video signal by the A/D converter 106. The digital video signal is sent to the luminance/chrominance signal forming circuit 120 included in the camera signal processing circuit 107.

At the luminance/chrominance signal forming circuit 120, the high-frequency component YH of the luminance signal, the low-frequency component YL of the luminance signal and the chrominance signals R and B are formed from the digital video signal. The red signal R and the blue signal B are respectively inputted to the gain control circuits 121 and 122, and are amplified there according to white balance control signals outputted from a gain control signal output circuit 125, so as to be outputted as chrominance signals R' and B', respectively.

The chrominance signals R' and B' are supplied, together with the low-frequency component YL of the luminance signal, to the color-difference signal forming circuit 123, where the color-difference signals R-Y and B-Y are formed. The color-difference signals R-Y and B-Y are supplied, together with the high-frequency component YH of the luminance signal, to the encoder 124, where the standard television signal is formed and outputted.

The camera microcomputer 109 reads the switching state of the WB mode selection switch 115 to make a check to find if the WB mode selection switch 115 is set to the outdoor mode (5600K mode) or the indoor mode (3200K mode) or the automatic mode. The camera microcomputer 109 forms, according to the mode as set, gain control signals for R gain and B gain which are beforehand stored in the camera microcomputer 109, and outputs the gain control signals to the gain control signal output circuit 125.

Next, the operation of the interchangeable-lens-type image pickup system shown in FIG. 23 is further described with reference to the flow charts of FIGS. 24 and 25. Referring to FIG. 24, the lens microcomputer 111 detects the ON/OFF-state of the ND-filter switching lever 112 to make a check to find if the ND filter 102 is in an ON-state (the state in which the ND filter 102 is inserted into the optical path of the lens 101) or in an OFF-state (the state in which the ND filter 102 is detached from the optical path of the lens 101) (step S801). If it is found that the ND filter 102 is in the ON-state, the lens microcomputer 111 sets an ND-filter-ON status flag (step S802), and transmits the thus-set ND-filter-ON status flag to the camera microcomputer 109 (step S804). On the other hand, if it is found that the ND filter 102 is in the OFF-state, the lens microcomputer 111 clears the ND-filter-ON status flag (step S803), and transmits the thus-cleared ND-filter-ON status flag to the camera microcomputer 109 (step S804).

Subsequently, referring to FIG. 25, the camera microcomputer 109 receives the ND-filter-ON status flag from the lens microcomputer 111 (step S901). Then, the camera microcomputer 109 reads the switching state of the WB mode selection switch 115 to make a check to find if the WB (white balance) mode is the outdoor mode (5600K mode) (step S902). If a result of the check made at step S902 indicates "YES", the camera microcomputer 109 forms gain control signals for R gain and B gain which are beforehand determined correspondingly with the outdoor mode (step S903), and outputs the gain control signals for R gain and B gain to the gain control signal output circuit 125 (step S907).

If the result of the check made at step S902 indicates "NO", the camera microcomputer 109 reads the switching state of the WB mode selection switch 115 to make a check to find if the WB mode is the indoor mode (3200K mode) (step S904). If a result of the check made at step S904 indicates "YES", the camera microcomputer 109 forms gain control signals for R gain and B gain which are beforehand determined correspondingly with the indoor mode (step S905), and outputs the gain control signals for R gain and B gain to the gain control signal output circuit 125 (step S907).

If the result of the check made at step S904 indicates "NO", the camera microcomputer 109 judges the WB mode selection switch 115 to be in the automatic mode, and computes gain control values for R gain and B gain for the automatic mode (step S906). Then, the camera microcomputer 109 outputs, to the gain control signal output circuit 125, the computed gain control values as gain control signals for R gain and B gain (step S907).

Next, the WB mode is briefly described with reference to FIGS. 26(a) to 26(d).

The outdoor mode is a WB (white balance) mode which is recommended to be used in picking up an image outdoors. Sunlight in the outdoors has generally high color temperature and is greatly bluish. Therefore, in the camera signal processing circuit 107, the R gain is controlled to become high and the B gain is controlled to become low, so that it becomes possible to reproduce the color close to that looked at even in the outdoors.

This arrangement can be verified by using a vector scope shown in FIG. 26(a). The vector scope shown in FIG. 26(a) is obtained in a case where, with all surfaces of a light box of color temperature of 5600K made white, an image pickup operation is performed in the 5600K mode. As is understandable from this diagram, a color exists at the center of the vector scope. This means that it is possible to recognize an object to be white.

The indoor mode is a WB mode which is recommended to be used in picking up an image indoors. Illumination light in the indoors has generally low color temperature and is greatly reddish. Therefore, in the camera signal processing circuit 107, the R gain is controlled to become low and the B gain is controlled to become high, so that it becomes possible to reproduce the color close to that looked at even in the indoors.

This arrangement can be verified by using a vector scope shown in FIG. 26(c). The vector scope shown in FIG. 26(c) is obtained in a case where, with all surfaces of a light box of color temperature of 3200K made white, an image pickup operation is performed in the 3200K mode. As is understandable from this diagram, a color exists at the center of the vector scope. This means that it is possible to recognize an object to be white.

It is preferable that the ND filter 102 is colorless. However, in actuality, when the ND filter 102 is mass-produced, the variance of spectral characteristics occurs, so that ND filters tinged with various colors, such as that tinged with red or tinged with blue, would be mass-produced.

In a case where such a tinged ND filter is used, if the ND filter 102 is brought into the ON-state, for example, in the so-called white state in which a bright point exists at the center of the vector scope as shown in FIG. 26(a), a picked-up image would be tinged due to the tinge of the ND filter 102 as shown in FIG. 26(b). As is understandable from this diagram, the position of the bright point on the vector scope deviates from the center of the vector scope. This means that the picked-up image is tinged with orange.

In the case of FIG. 26(d), which is similar to the case of FIG. 26(b), if the ND filter 102 is brought into the ON-state in such a state as shown in FIG. 26(c), a picked-up image would be tinged, so that the position of a bright point on the vector scope deviates from the center of the vector scope toward the direction of orange, in a manner similar to the case of FIG. 26(b). While FIGS. 26(b) and 26(d) show a case where the ND filter is tinged with orange, as an example, the ND filter may be tinged with red or blue.

Next, a third example of prior art is described.

A conventional image pickup apparatus, such as a video camera, according to the third example of prior art is described with reference to FIG. 27 and FIGS. 28(a) to 28(c).

Referring to FIG. 27, the image pickup apparatus according to the third example of prior art includes a photographic lens 1, an iris 2, an image sensor 3, a CDS/AGC circuit 4, an A/D converter 5, a digital signal processing circuit 6, a D/A converter 7, a microcomputer 8 for performing a logical arithmetic operation, an IG meter 9, a Hall element 10, an iris encoder 11 and an iris driving circuit 12.

Next, the operation of the image pickup apparatus according to the third example of prior art is described.

An object image made incident on the image sensor 3 by the photographic lens 1 is photoelectrically converted into an electrical signal by the image sensor 3. The electrical signal is correlated-double-sampled and amplified to a suitable level by the CDS/AGC circuit 4. The thus-processed electrical signal is converted into a digital signal by the A/D converter 5. The digital signal is converted into a standardized video signal, such as that of the NTSC system, by the digital signal processing circuit 6. The video signal is then converted into an analog signal by the D/A converter 7 and is externally outputted.

On the other hand, the rotational position of the IG meter 9, which is arranged to drive the iris 2 in the opening direction and in the closing direction, is magnetically detected by the Hall element 10. A result of detection of the rotational position of the IG meter 10 is amplified and offset-controlled to a suitable level by the iris encoder 11 and is then taken in the microcomputer 8 as data after A/D conversion.

During the above-mentioned process, the microcomputer 8 reads information on the video signal level from the digital signal processing circuit 6 and information on the opening-and-closing state of the iris 2 from the iris encoder 11. Then, the microcomputer 8 computes a control signal for the iris 3 and outputs the control signal to the iris driving circuit 12 in such a way as to make the video signal level small if it is too large or in such a way as to make the video signal level large if it is too small. The iris driving circuit 12 drives the IG meter 9 according to the control signal.

In the above-described process, an iris mechanism composed of the iris 2, the IG meter 9 and the Hall element 10 operates in such a way as to make the brightness of an object image formed on the image sensor 3 constant. Here, in a case where the brightness of an object is extremely high, the aperture diameter of the iris 2 becomes very small. In this case, the sharpness of an object image formed on the image sensor 3 is sometimes lost due to the diffraction phenomenon of light.

In order to prevent this problem, in general video cameras, an ND filter, serving as an achromatic light-attenuating filter, is made to be inserted into the space between the photographic lens 1 and the iris 2, so that the aperture diameter of the iris 2 is prevented from becoming smaller than a given value.

In many cases, if the iris 2 is of a general twin-blade type, the ND filter is arranged integrally with an iris blade, i.e., is stuck to a part of the iris blade.

An example of the iris mechanism using the ND filter is shown in FIGS. 28(a) to 28(c).

Referring to FIGS. 28(a) to 28(c), the iris mechanism includes iris blades 21 and 22, an ND filter 23 stuck to a part of the iris blade 21, and an IG meter 9, and a rotor 91 mounted on the rotary shaft of the IG meter 9.

Assuming that, in the beginning, the iris 2 is in a fully-open state as shown in FIG. 28(a) and then begins to close, when the IG meter 9 is driven to cause the rotor 91 to rotate around the rotary shaft of the IG meter 9, the aperture of the iris mechanism comes to take such a shape as shown in FIG. 28(b) and, at the time of completion of closing of the iris mechanism, comes to take such a shape as shown FIG. 28(c).

As the aperture diameter of the iris 2 becomes smaller in such a progress as shown in FIG. 28(a) to FIG. 28(c), the ratio in area of the ND filter 23 to the aperture shape of the iris 2 becomes greater. When the aperture diameter of the iris 2 becomes small up to a certain degree, the ND filter comes to cover the whole area of the aperture shape of the iris 2.

In such an iris mechanism as described above in which the ND filter 23 exists at a part of the aperture shape of the iris, no problem arises when an object image formed on the image pickup plane is in an in-focus state. However, when the object image is in an out-of-focus state, or when the object image is an image other than an aimed object, for example, a background, since the focusing state of the object image is uneven in many cases, the shape of a circle of confusion for the object image would become very irregular.

In general, when the object image is in an out-of-focus state, or when the object image is the one which is necessarily in an out-of-focus state, such as a background, it is preferable, from the viewpoint of observation, that the shape of a circle of confusion for the object image is close to a true circle. The shape other than the one close to a true circle results in that the so-called taste of blurring is not good.

In the case of low-priced general video cameras, such a bad taste of blurring almost does not give rise to any problem. However, in the case of high-grade video cameras in which importance is attached to the image-quality function in some degree, it is a relatively important subject to improve the taste of blurring. Accordingly, in some of the high-grade video cameras, in order to improve the taste of blurring, the ND filter is not arranged integrally with the iris mechanism. Instead, there is provided a mechanism for inserting the ND filter from outside, or the camera body is provided with an external switch, such as a switching lever as described in the first and second examples of prior art, to enable the user to insert and detach the ND filter according to necessity.

In the image pickup apparatus according to the first example of prior art as shown in FIG. 21, there is such a first problem that, since the ND filter causes the transmission factor for the quantity of light in the image pickup optical system to greatly decrease, when the ND filter is switched from the ON-state to the OFF-state or when the ND filter is switched from the OFF-state to the ON-state, the quantity of light made incident on the image sensor varies greatly before and after the switching of the ND filter, so that the variation of an exposure level occurs, it takes time until a correct exposure is obtained and stabilized, and an awkward image is picked up during that period of time.

Further, in the image pickup system composed of the lens unit and the camera body according to the second example of prior art as shown in FIG. 23, there is such a second problem that, since the ND filter is tinged with some color, if the ND filter is inserted or detached when the 5600K mode or the 3200K mode is selected as the WB mode, the reproduction of color of an object image varies before and after the insertion or detachment of the ND filter.

In addition, since the image pickup apparatus according to the second example of prior art is of the interchangeable-lens type, when the lens unit is exchanged with another lens unit, ND filters change accordingly. In other words, the unevenness of the influence of the tinged ND filter makes it difficult to control the white balance mode on the side of the camera body.

Further, in the image pickup apparatus according to the third example of prior art as shown in FIG. 27, there is such a third problem, similar to the first problem, that, since the ND filter is mechanically inserted, when the ND filter is inserted in the process of an image pickup operation, an image plane becomes dark in that moment and, after a while, the iris control mechanism or the AGC control mechanism of the camera becomes operative, so that, when the same object image continues being picked up, a picked-up image gives an unnatural feeling to the user undesirably.

BRIEF SUMMARY OF THE INVENTION

It is an object of the invention to provide a quantity-of-light adjusting apparatus, for an image pickup apparatus or the like, which is capable of, when a state of limitation of incident light is changed by an ND filter, making the variation of incident light due to that change appropriate, a control method for the quantity-of-light adjusting apparatus, and a computer program product providing a control program for the quantity-of-light adjusting apparatus.

To attain the above object, in accordance with an aspect of the invention, in a quantity-of-light adjusting apparatus having an iris and an ND filter which limit incident light, a control method for the quantity-of-light adjusting apparatus, and a computer program product providing a control program for the quantity-of-light adjusting apparatus, a state of limitation of the incident light by the iris is changed at a first changing speed, and, when a state of limitation of the incident light by the ND filter is changed, the state of limitation of the incident light by the iris is changed at a second changing speed different from the first changing speed.

In accordance with another aspect of the invention, in a quantity-of-light adjusting apparatus having an ND filter which limits incident light and a light receiving sensor which receives the incident light, a control method for the quantity-of-light adjusting apparatus, and a computer program product providing a control program for the quantity-of-light adjusting apparatus, a gain of output of the light receiving sensor is changed at a first changing speed, and, when a state of limitation of the incident light by the ND filter is changed, the gain of output of the light receiving sensor is changed at a second changing speed different from the first changing speed.

In accordance with a further aspect of the invention, in an optical unit having an ND filter which limits incident light, and/or an image pickup apparatus on which the optical unit is mounted, a control method for the optical unit and/or the image pickup apparatus, and a computer program product providing a control program for the optical unit and/or the image pickup apparatus, the optical unit transmits color information of the ND filter to the image pickup apparatus, and the image pickup apparatus receives the color information of the ND filter transmitted from the optical unit and corrects, on the basis of the received color information of the ND filter, white balance of an image taken in through the optical unit.

In accordance with a still further aspect of the invention, in a quantity-of-light adjusting apparatus having an ND filter which limits incident light and an iris which limits the incident light, a control method for the quantity-of-light adjusting apparatus, and a computer program product providing a control program for the quantity-of-light adjusting apparatus, the quantity-of-light adjusting apparatus determines an operating state of the ND filter and controls an operation of the iris according to a result of the determination.

In accordance with a still further aspect of the invention, in a quantity-of-light adjusting apparatus having an ND filter which limits incident light and a light receiving sensor which receives the incident light, a control method for the quantity-of-light adjusting apparatus, and a computer program product providing a control program for the quantity-of-light adjusting apparatus, the quantity-of-light adjusting apparatus determines an operating state of the ND filter and controls a gain of output of the light receiving sensor according to a result of the determination.

In accordance with a still further aspect of the invention, in a quantity-of-light adjusting apparatus having an iris which limits incident light and an ND filter capable of operating independent of the iris, a control method for the quantity-of-light adjusting apparatus, and a computer program product providing a control program for the quantity-of-light adjusting apparatus, the quantity-of-light adjusting apparatus determines an operating state of the iris and controls an operation of the ND filter according to a result of the determination.

The above and other objects and aspects of the invention will become apparent from the following detailed description of preferred embodiments thereof taken in conjunction with the accompanying drawings.

BRIEF DESCRIPTION OF THE SEVERAL VIEWS OF THE DRAWING

FIGS. 26(*a*) to 26(*d*) are characteristic diagrams showing vector scopes for explaining the influence of an ND filter.

FIGS. 28(*a*) to 28(*c*) are constructional diagrams showing an example of a manner in which an ND filter is mounted on one of iris blades according to the third example of prior art, and the variation of an aperture formed by the opening/closing operation of the iris blades.

DETAILED DESCRIPTION OF THE INVENTION

Hereinafter, preferred embodiments of the invention will be described in detail with reference to the drawings.

First Embodiment

Figure 1:
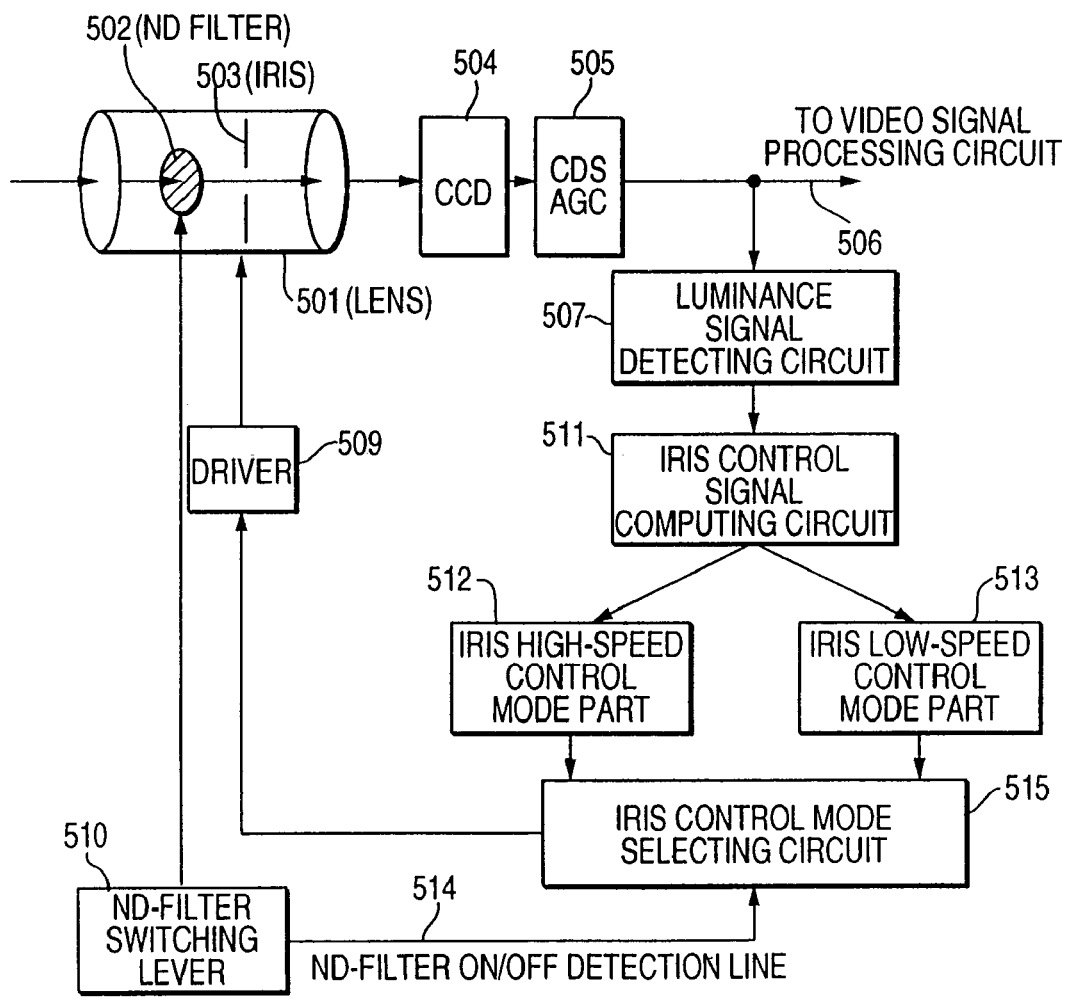
FIG. 1 is a block diagram showing the arrangement of an image pickup apparatus according to a first embodiment of the invention.

FIG. 1 is a block diagram showing the arrangement of an image pickup apparatus according to a first embodiment of the invention. In FIG. 1, parts corresponding to those shown in FIG. 21 are denoted by the same reference numerals 501 to 507, 509 and 510, and the duplicate description thereof is omitted here.

Figure 21:
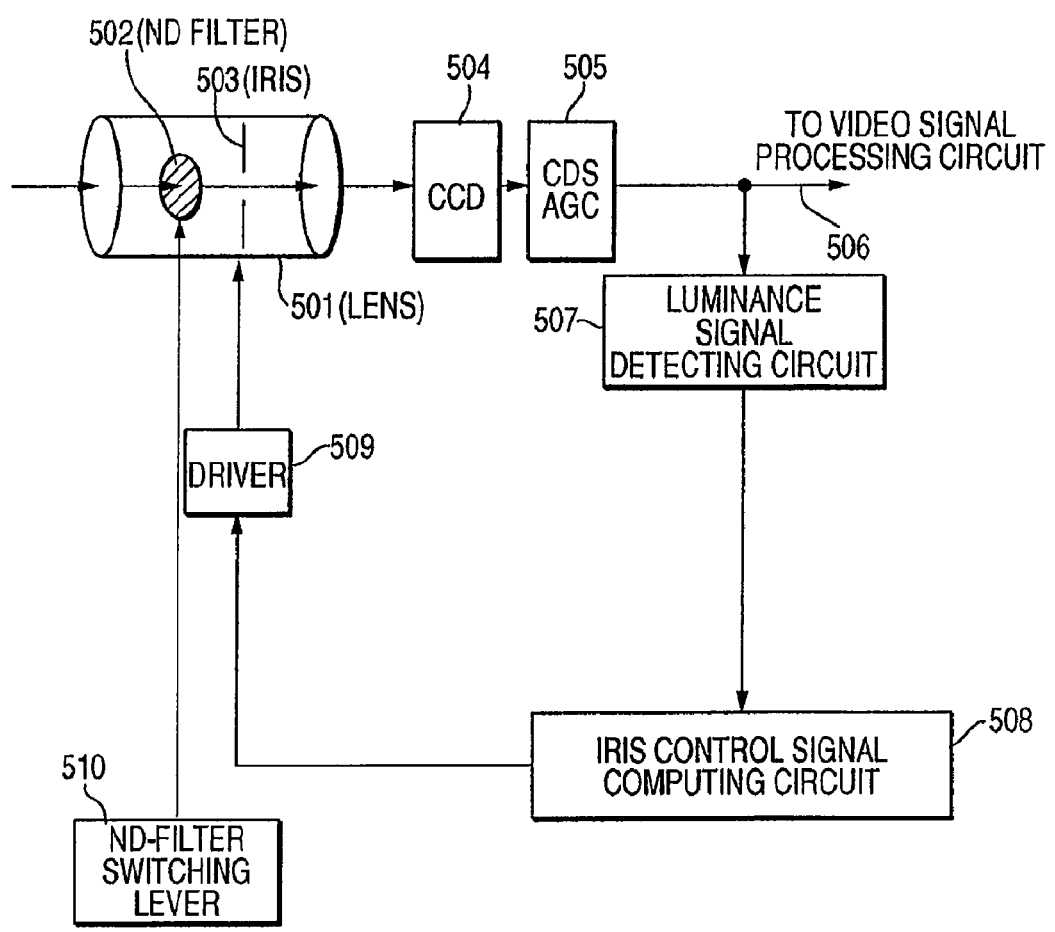
FIG. 21 is a block diagram showing the arrangement of an image pickup apparatus according to a first example of prior art.
Figure 22:
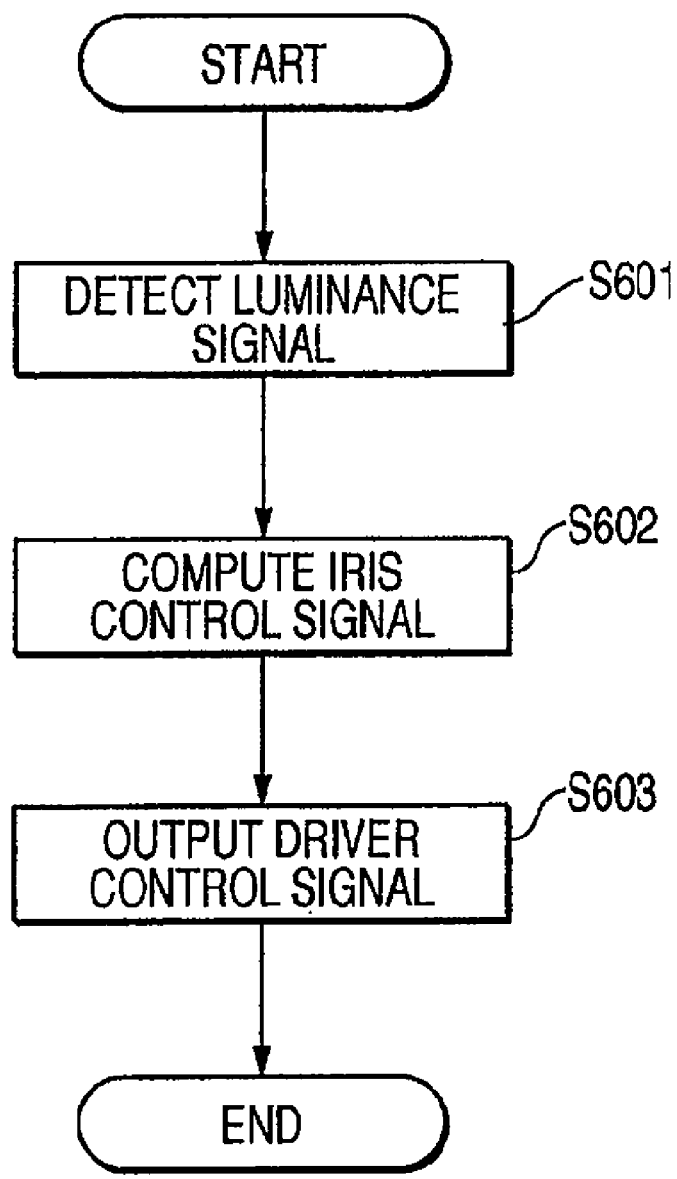
FIG. 22 is a flow chart showing the operation of the image pickup apparatus according to the first example of prior art.

In the following, parts different from those shown in FIG. 21 are mainly described with reference to FIG. 1.

Referring to FIG. 1, the image pickup apparatus according to the first embodiment includes, in addition to the parts as mentioned above, an iris control signal computing circuit 511 for computing an iris control signal according to the luminance signal detected by the luminance signal detecting circuit 507, an iris high-speed control mode part 512 for causing the iris 503 to operate at a high speed, an iris low-speed control mode part 513 for causing the iris 503 to operate at a low speed, an ND-filter ON/OFF detection line 514 for detecting whether the ND filter 502 is in the ON-state or in the OFF-state, and an iris control mode selecting circuit 515 for selecting one of the iris high-speed control mode part 512 and the iris low-speed control mode part 513 by detecting, through the ND-filter ON/OFF detection line 514, information indicative of whether the ND filter 502 is in the ON-state or in the OFF-state.

Next, the operation of the image pickup apparatus according to the first embodiment is described.

As a luminance signal for use in controlling an exposure, there is used a luminance signal, including a high-frequency component, included in a video signal outputted from the CDS/AGC circuit 505. The luminance signal is detected by the luminance signal detecting circuit 507 and is, then, sent to the iris control signal computing circuit 511. The iris control signal computing circuit 511 computes iris control signals by comparing the luminance signal with a predetermined reference value (a correct exposure level), in such a way as to make always constant the luminance signal detected by the luminance signal detecting circuit 507.

In that instance, the iris control signal computing circuit 511 forms two kinds of iris control signals, i.e., one for causing the iris 503 to operate at a high speed and the other for causing the iris 503 to operate at a low speed. The response at which the exposure is controlled by the iris 503 (the amount of change of exposure per unit time) is set always constant. In ordinary cases, the iris control signal for causing the iris 503 to operate at a low speed is used.

On the other hand, when the user changes the state of insertion/detachment of the ND filter 502 by switching the ND-filter switching lever 510 from the ON-state to the OFF-state or from the OFF-state to the ON-state, the quantity of light passing through the lens 501 varies greatly to cause a large change of a video signal formed by the image sensor 504, so that a large change of luminance occurs to disturb an exposure state greatly. To solve this situation, the iris high-speed control mode part 512 is selected by the iris control mode selecting circuit 515 so as to make faster than in ordinary cases the response at which the exposure is controlled by the iris 503 (to make larger than in ordinary cases the amount of change of exposure per unit time). That is, the operation of the iris 503 is controlled in such a way as to make, as short as possible, a period of time required until a correct exposure is obtained.

Next, the advantageous effect to be obtainable by the above-described control operation is described with reference to FIGS. 5(*a*) and 5(*b*).

Figure 5:
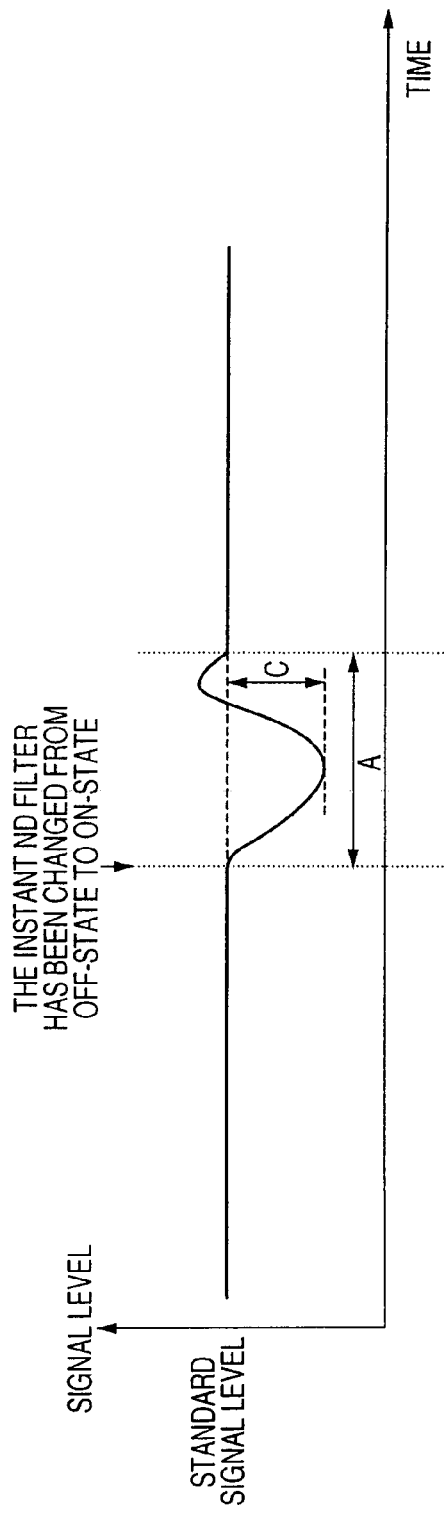
FIGS. 5(a) and 5(b) are characteristic diagrams showing the advantageous effect obtained according to the first or second example as compared with prior art.
Figure 5:
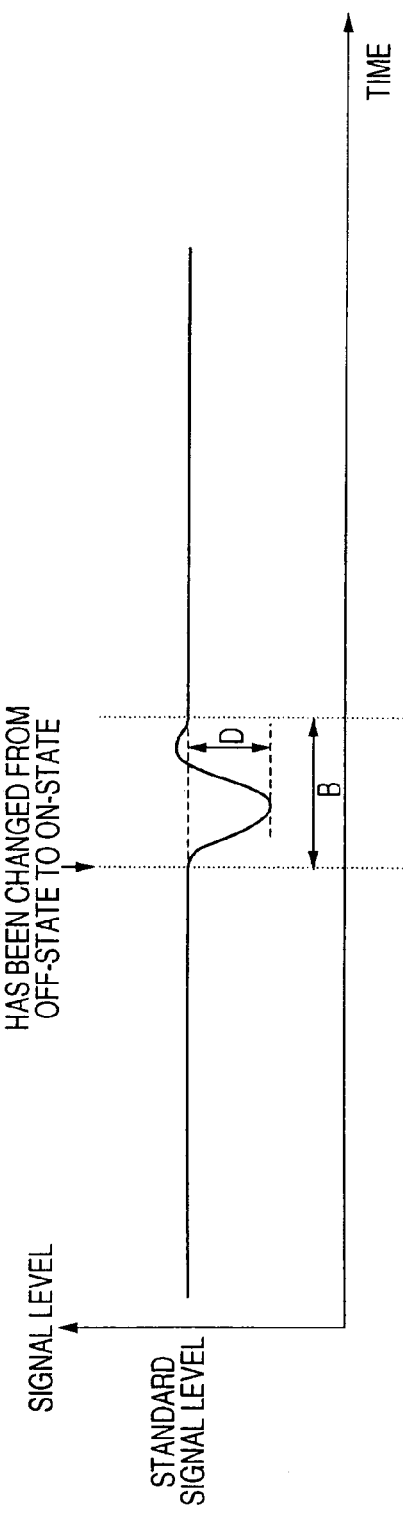

FIG. 5(*a*) and FIG. 5(*b*), which respectively correspond to the case of prior art and the case of the invention, show the change of a signal level occurring immediately after the ND filter 502 is changed from the OFF-state to the ON-state, as graphs with the vertical axis representing the signal level and the horizontal axis representing time.

As is understood from FIGS. 5(a) and 5(b), a period of time of change B in the signal level in the case of the invention (FIG. 5(b)) is shorter than a period of time of change A in the signal level in the case of prior art (FIG. 5(a)), and the magnitude of change D in the signal level in the case of the invention (FIG. 5(b)) is smaller than the magnitude of change C in the signal level in the case of prior art (FIG. 5(a)). Thus, it is understood that if the iris 503 is caused to operate at a high speed immediately after the ND filter 502 is changed from the OFF-state to the ON-state, a change of luminance of a video signal becomes small and a correct exposure is speedily resumed.

Figure 2:
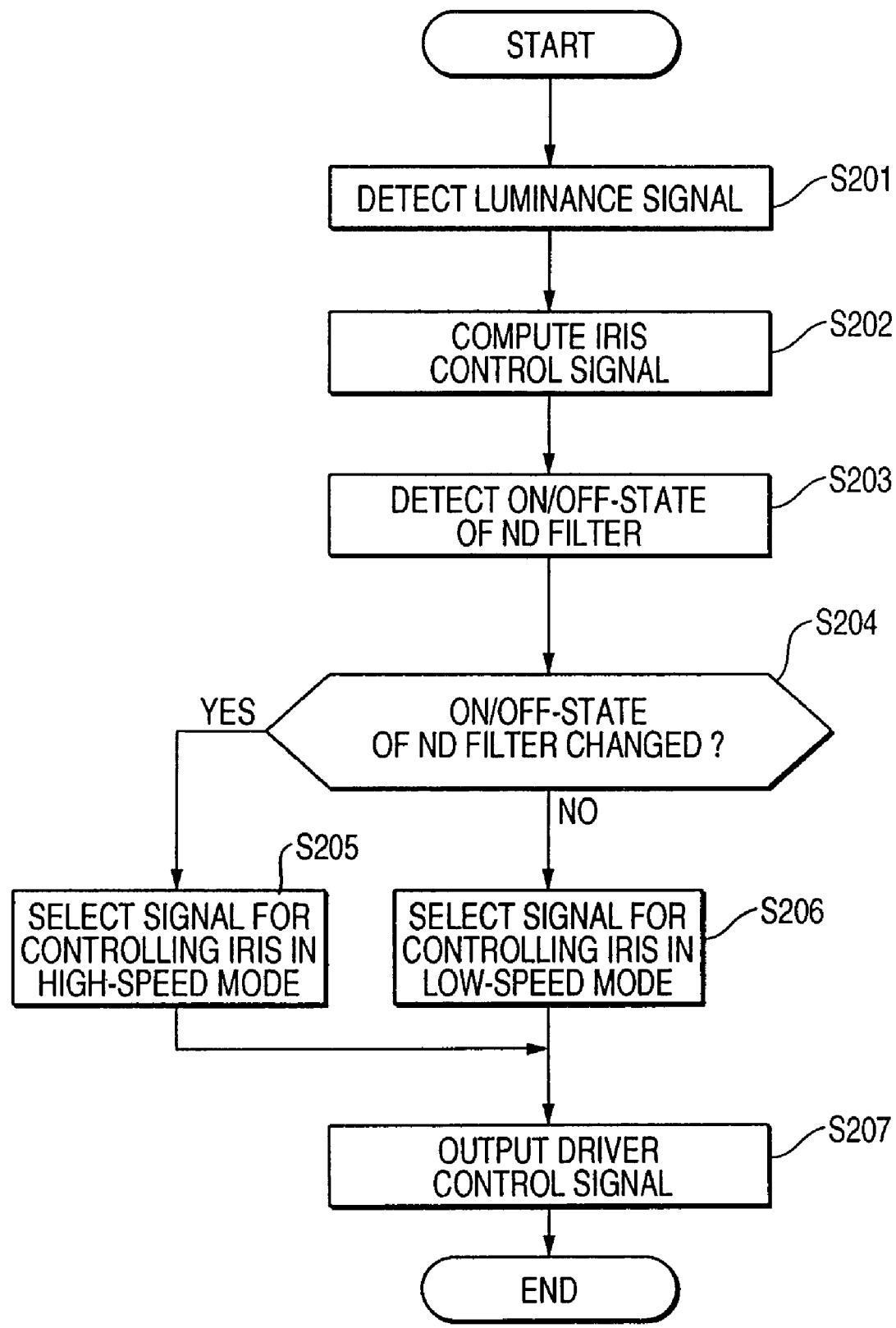
FIG. 2 is a flow chart showing the operation of the image pickup apparatus according to the first embodiment of the invention.

Next, the operation of the image pickup apparatus according to the first embodiment is described with reference to the flow chart of FIG. 2.

First, a luminance signal, including a high-frequency component, included in a video signal outputted from the CDS/AGC circuit 505 is detected (step S201). Then, the detected luminance signal is compared with a predetermined reference value (a correct exposure level). If the luminance signal is not less than the reference value, such a control signal as to cause the iris 503 to operate in the closing direction is computed, and, if the luminance signal is less than the reference value, such a control signal as to cause the iris 503 to operate in the opening direction is computed (step S202).

Subsequently, the state of the ND-filter switching lever 510 is inputted to the iris control mode selecting circuit 515 through the ND-filter ON/OFF detection line 514 (step S203). According to information on the state of the ND-filter switching lever 510, any change of the state of the ND filter 502 is detected (step S204), i.e., it is detected whether the ND filter 502 is stable in the ON-state, whether the ND filter 502 is stable in the OFF-state, whether the ND filter 502 is changed from the ON-state to the OFF-state, or whether the ND filter 502 is changed from the OFF-state to the ON-state.

If the ND filter 502 is stable in the ON-state, or if the ND filter 502 is stable in the OFF-state, the flow branches from step S204 to step S206. In step S206, the iris low-speed control mode part 513 is selected by the iris control mode selecting circuit 515, so that a control signal for controlling the iris 503 in the low-speed mode is selected. If the ND filter 502 is changed from the ON-state to the OFF-state, or if the ND filter 502 is changed from the OFF-state to the ON-state, the flow branches from step S204 to step S205. In step S205, the iris high-speed control mode part 512 is selected by the iris control mode selecting circuit 515, so that a control signal for controlling the iris 503 in the high-speed mode is selected. Then, the control signal is outputted to the driver 509 to drive the iris 503 accordingly (step S207).

Second Embodiment

Figure 3:
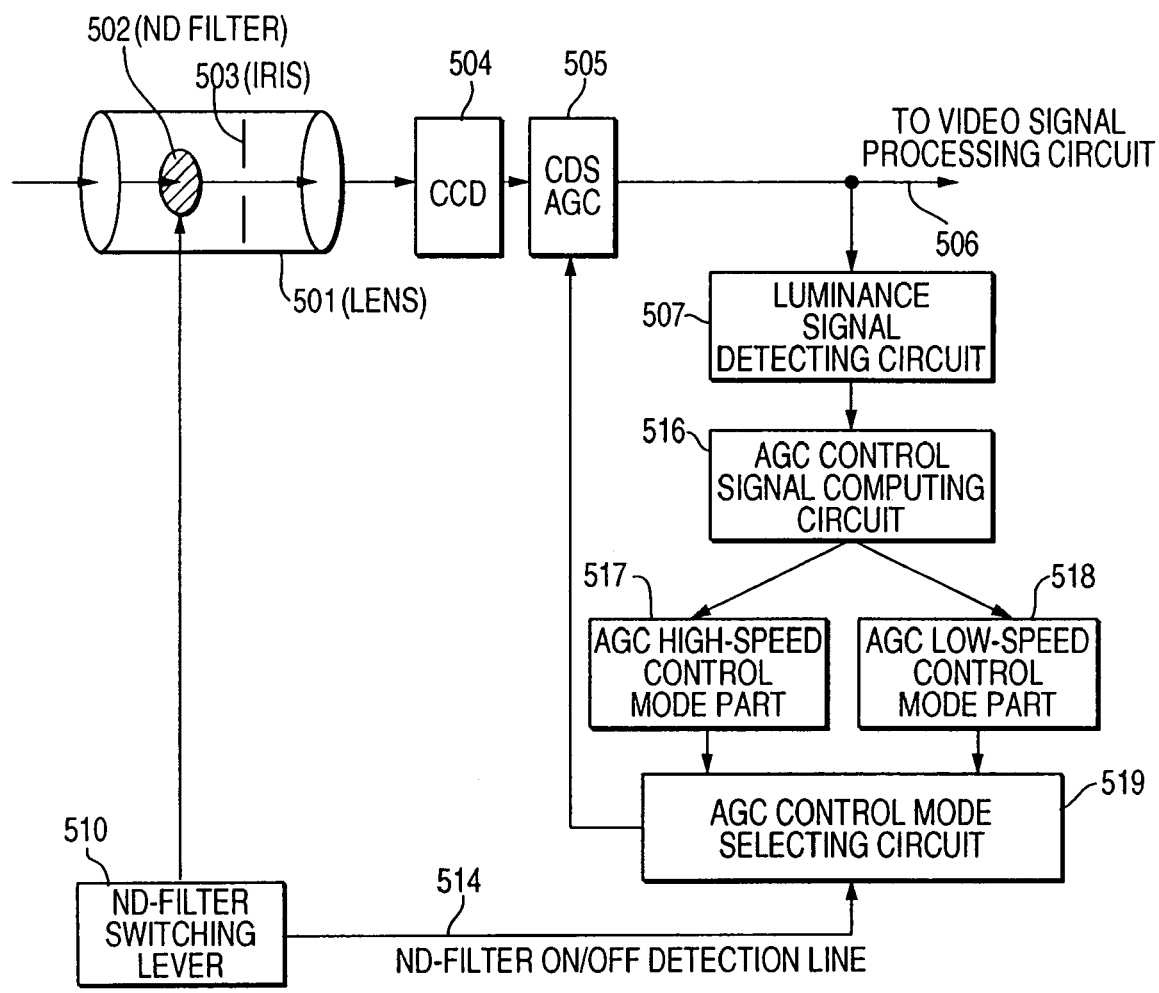
FIG. 3 is a block diagram showing the arrangement of an image pickup apparatus according to a second embodiment of the invention.

FIG. 3 is a block diagram showing the arrangement of an image pickup apparatus according to a second embodiment of the invention. In FIG. 3, parts corresponding to those shown in FIG. 21 are denoted by the same reference numerals 501 to 507, 509 and 510, and the duplicate description thereof is omitted here.

In the following, parts different from those shown in FIG. 21 are mainly described with reference to FIG. 3.

Referring to FIG. 3, the image pickup apparatus according to the second embodiment includes, in addition to the parts as mentioned above, an AGC control signal computing circuit 516 for computing and forming an AGC control signal according to the luminance signal detected by the luminance signal detecting circuit 507, an AGC high-speed control mode part 517 for causing the AGC gain to operate at a high speed, an AGC low-speed control mode part 518 for causing the AGC gain to operate at a low speed, an ND-filter ON/OFF detection line 514 for detecting whether the ND filter 502 is in the ON-state or in the OFF-state, and an AGC control mode selecting circuit 519 for selecting one of the AGC high-speed control mode part 517 and the AGC low-speed control mode part 518 by detecting, through the ND-filter ON/OFF detection line 514, information indicative of whether the ND filter 502 is in the ON-state or in the OFF-state.

Next, the operation of the image pickup apparatus according to the second embodiment is described.

As a luminance signal for use in controlling an exposure, there is used a luminance signal, including a high-frequency component, included in a video signal outputted from the CDS/AGC circuit 505. The luminance signal is detected by the luminance signal detecting circuit 507 and is, then, sent to the AGC control signal computing circuit 516. The AGC control signal computing circuit 516 computes AGC control signals by comparing the luminance signal with a predetermined reference value (a correct exposure level), in such a way as to make always constant the luminance signal detected by the luminance signal detecting circuit 507. In that instance, the AGC control signal computing circuit 516 forms two kinds of AGC control signals, i.e., one for causing the AGC gain to operate at a high speed and the other for causing the AGC gain to operate at a low speed.

The response at which the exposure is controlled by the AGC gain (the amount of change of exposure per unit time) is set always constant. In ordinary cases, the AGC control signal for causing the AGC gain to operate at a low speed is used.

On the other hand, when the user changes the state of insertion/detachment of the ND filter 502 by switching the ND-filter switching lever 510 from the ON-state to the OFF-state or from the OFF-state to the ON-state, the quantity of light passing through the lens 501 varies greatly to cause a large change of a video signal formed by the image sensor 504, so that a large change of luminance occurs to disturb an exposure state greatly.

To solve this situation, the AGC high-speed control mode part 517 is selected by the AGC control mode selecting circuit 519 so as to make faster than in ordinary cases the response at which the exposure is controlled by the AGC gain (to make larger than in ordinary cases the amount of change of exposure per unit time). That is, the AGC gain is controlled in such a way as to make, as short as possible, a period of time required until a correct exposure is obtained.

The advantageous effect to be obtainable by the above-described control operation is the same as that described with reference to FIGS. 5(a) and 5(b). That is, a period of time of change in the signal level in the case of the second embodiment is shorter than in the case of prior art, and the magnitude of change in the signal level in the case of the second embodiment is smaller than in the case of prior art. Thus, it is understood that if the AGC gain is caused to operate at a high speed immediately after the ND filter 502 is changed from the OFF-state to the ON-state or from the OFF-state to the ON-state, a change of luminance of a video signal becomes small and a correct exposure is speedily resumed.

Figure 4:
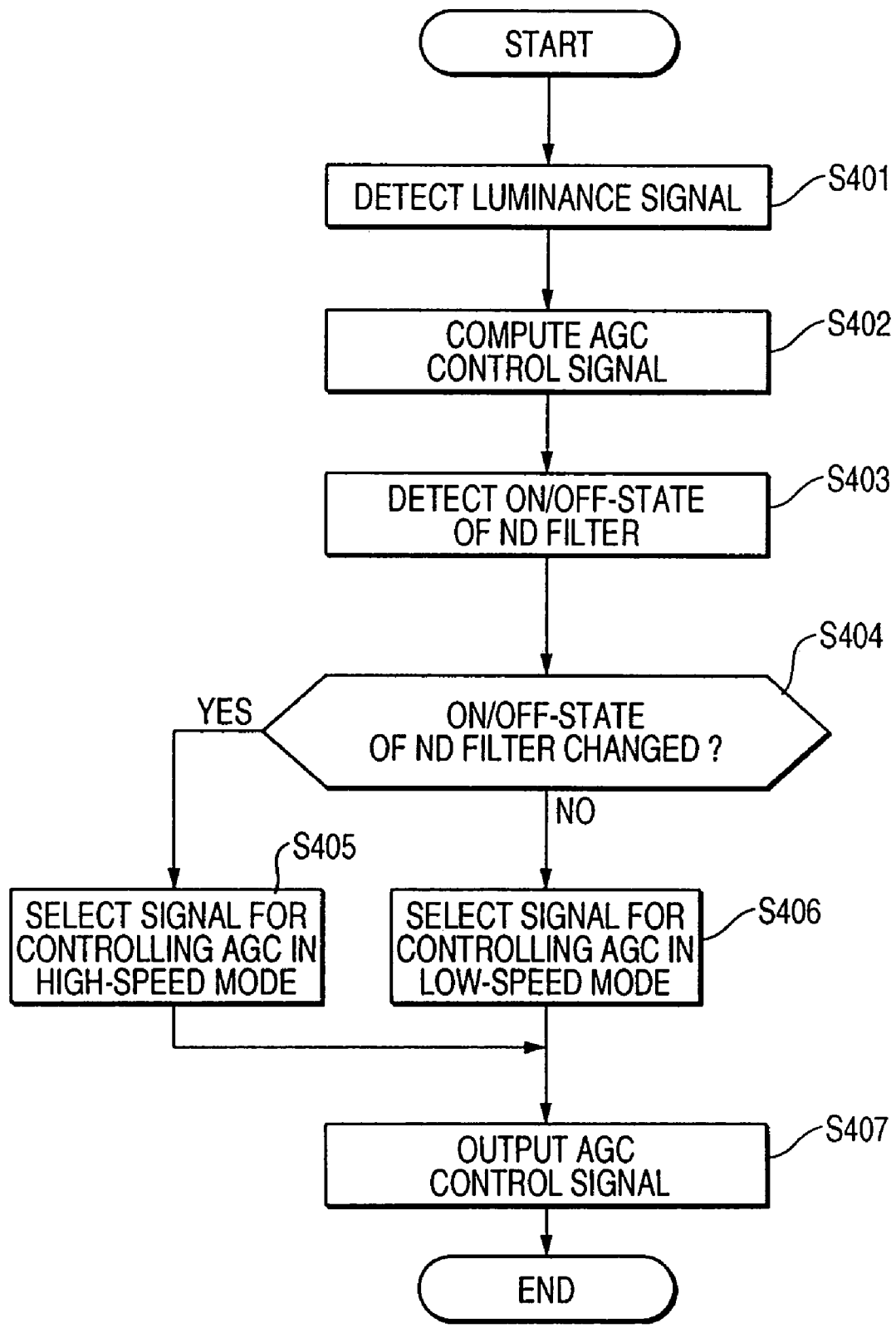
FIG. 4 is a flow chart showing the operation of the image pickup apparatus according to the second embodiment.

Next, the operation of the image pickup apparatus according to the second embodiment is described with reference to the flow chart of FIG. 4.

First, a luminance signal, including a high-frequency component, included in a video signal outputted from the CDS/AGC circuit 505 is detected (step S401). Then, the detected luminance signal is compared with a predetermined reference value (a correct exposure level). If the luminance signal is not less than the reference value, such a control signal as to cause the AGC gain to lower is computed, and, if the luminance signal is less than the reference value, such a control signal as to cause the AGC gain to heighten is computed (step S402).

Subsequently, the state of the ND-filter switching lever 510 is inputted to the AGC control mode selecting circuit 519 through the ND-filter ON/OFF detection line 514 (step S403). According to information on the state of the ND-filter switching lever 510, any change of the state of the ND filter 502 is detected (step S404), i.e., it is detected whether the ND filter 502 is stable in the ON-state, whether the ND filter 502 is stable in the OFF-state, whether the ND filter 502 is changed from the ON-state to the OFF-state, or whether the ND filter 502 is changed from the OFF-state to the ON-state.

If the ND filter 502 is stable in the ON-state, or if the ND filter 502 is stable in the OFF-state, the flow branches from step S404 to step S406. In step S406, the AGC low-speed control mode part 518 is selected by the AGC control mode selecting circuit 519, so that a control signal for controlling the AGC gain in the low-speed mode is selected. If the ND filter 502 is changed from the ON-state to the OFF-state, or if the ND filter 502 is changed from the OFF-state to the ON-state, the flow branches from step S404 to step S405. In step S405, the AGC high-speed control mode part 517 is selected by the AGC control mode selecting circuit 519, so that a control signal for controlling the AGC gain in the high-speed mode is selected. Then, the control signal for the AGC gain is outputted to the CDS/AGC circuit 505 accordingly (step S407).

According to the first or second embodiment described above, the operation of the iris or the operation of the AGC gain is controlled at a high speed in response to a change of the state of the ND filter, so that the disturbance of an exposure due to the insertion/detachment of the ND filter can be lessened, and a correct exposure can be speedily resumed. As a result, the first problem mentioned in the foregoing can be solved.

Third Embodiment

Figure 23:
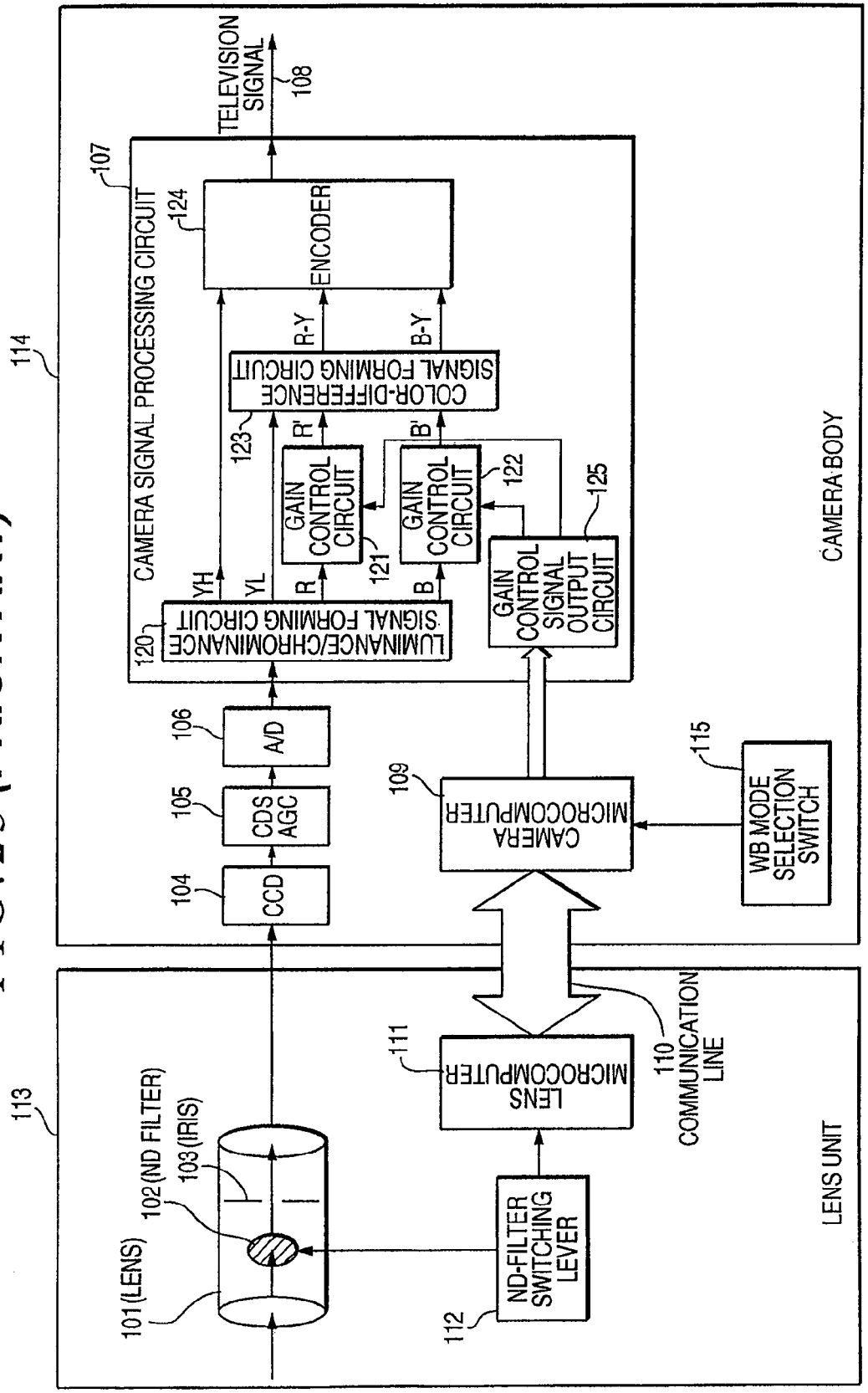
FIG. 23 is a block diagram showing the arrangement of an interchangeable-lens type image pickup system according to the third embodiment of the invention and according to a second example of prior art.
Figure 24:
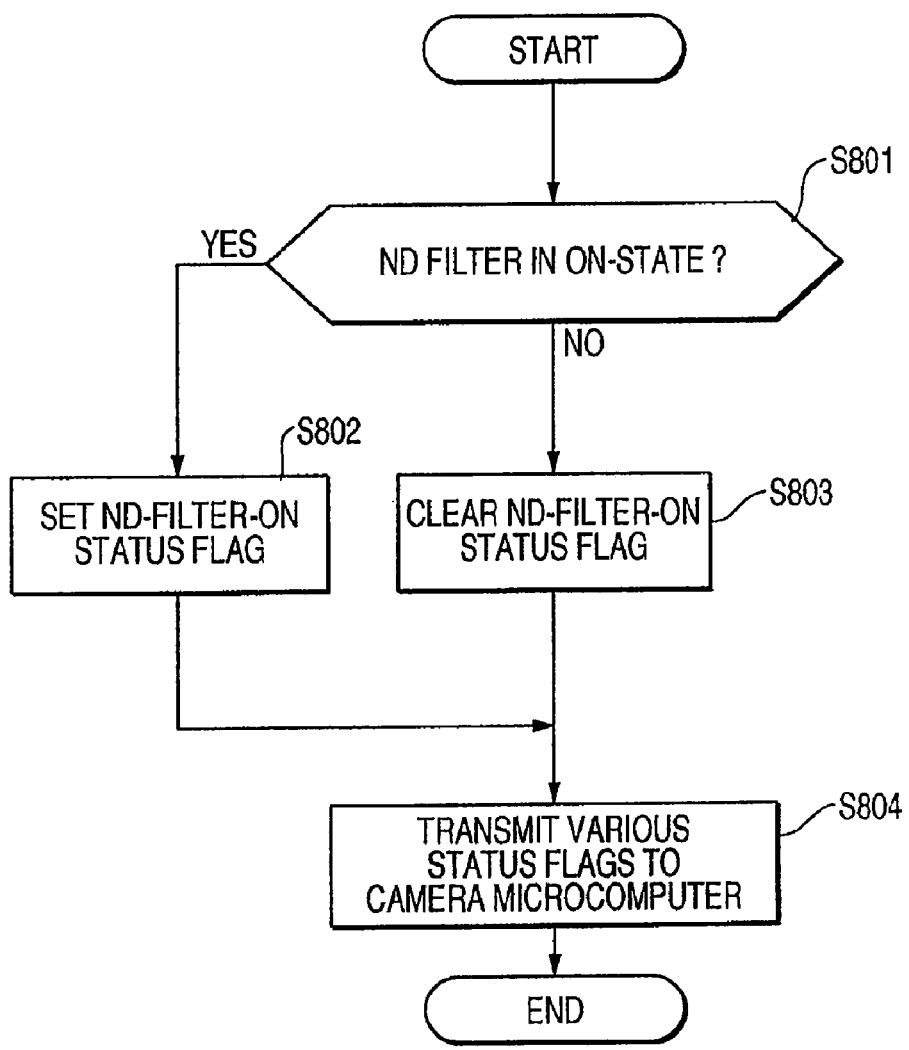
FIG. 24 is a flow chart showing the operation of a lens microcomputer according to the second example of prior art.
Figure 25:
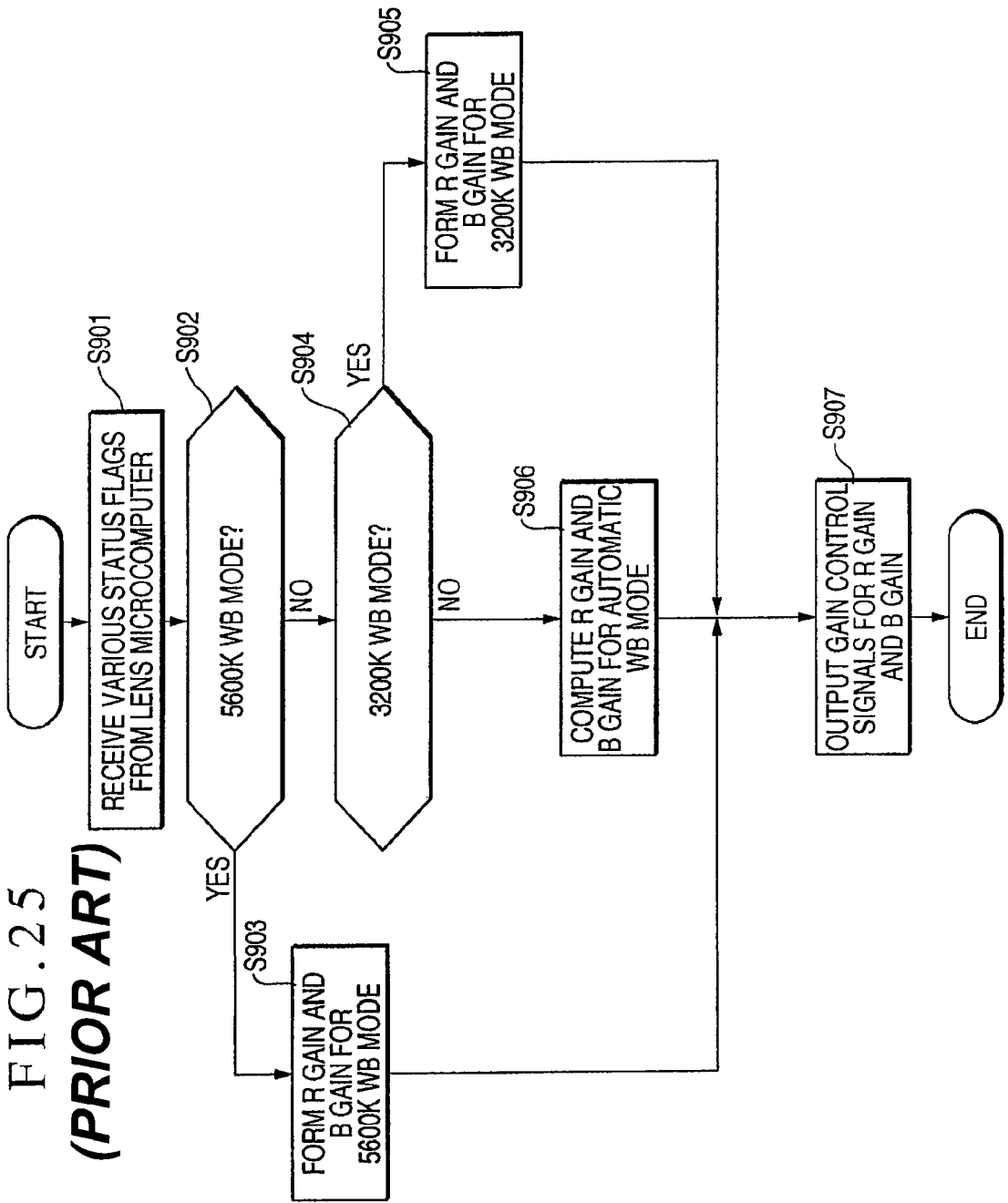
FIG. 25 is a flow chart showing the operation of a camera microcomputer according to the second example of prior art.

FIG. 23 is a block diagram showing the arrangement of an interchangeable-lens type image pickup system according to a third embodiment of the invention. The arrangement of the interchangeable-lens type image pickup system according to the third embodiment is substantially the same as that according to the above-described second example of prior art.

Next, the operation of the interchangeable-lens type image pickup system according to the third embodiment is described with reference to the flow charts of FIGS. 6 and 7.

Figure 6:
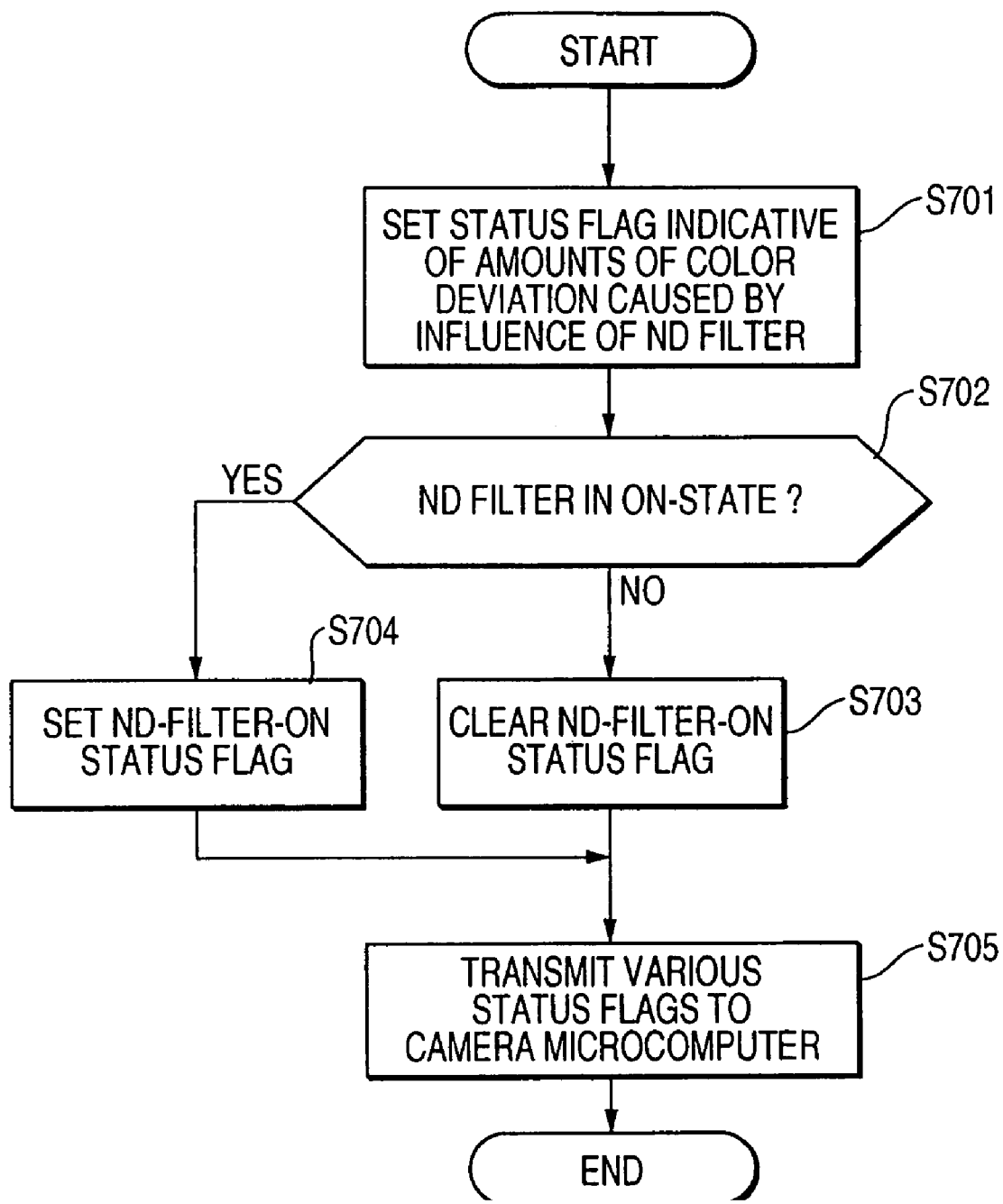
FIG. 6 is a flow chart showing the operation of a lens microcomputer according to a third embodiment of the invention.

Referring to FIG. 6, which is a flow chart showing the processing operation of the lens microcomputer 111, first, the lens microcomputer 111 sets a status flag serving as information indicative of the amounts of color deviation caused by the influence of the ND filter 102 (step S701). This status flag varies with individual ND filters 102 incorporated in the respective lens units 113, and is stored in the lens microcomputer 111 at the time of adjustment of each lens unit 113.

The contents of that status flag are composed of values representing, with burst ratios, the amounts of deviation from the center position of the vector scope, such as the amount of color deviation 1001 in R-Y and the amount of color deviation 1002 in B-Y as shown in FIG. 26(b).

Subsequently, the lens microcomputer 111 detects the ON/OFF-state of the ND-filter switching lever 112 to make a check to find if the ND filter 102 is in an ON-state (the state in which the ND filter 102 is inserted into the optical path of the lens 101) or in an OFF-state (the state in which the ND filter 102 is detached from the optical path of the lens 101) (step S702). If it is found that the ND filter 102 is in the ON-state, the lens microcomputer 111 sets an ND-filter-ON status flag (step S704), and transmits the status flag obtained in step S701 and the ND-filter-ON status flag obtained in step S704 to the camera microcomputer 109 (step S705).

On the other hand, if it is found that the ND filter 102 is in the OFF-state, the lens microcomputer 111 clears the ND-filter-ON status flag (step S703), and transmits the status flag obtained in step S701 and the ND-filter-ON status flag obtained in step S703 to the camera microcomputer 109 (step S705).

Figure 7:
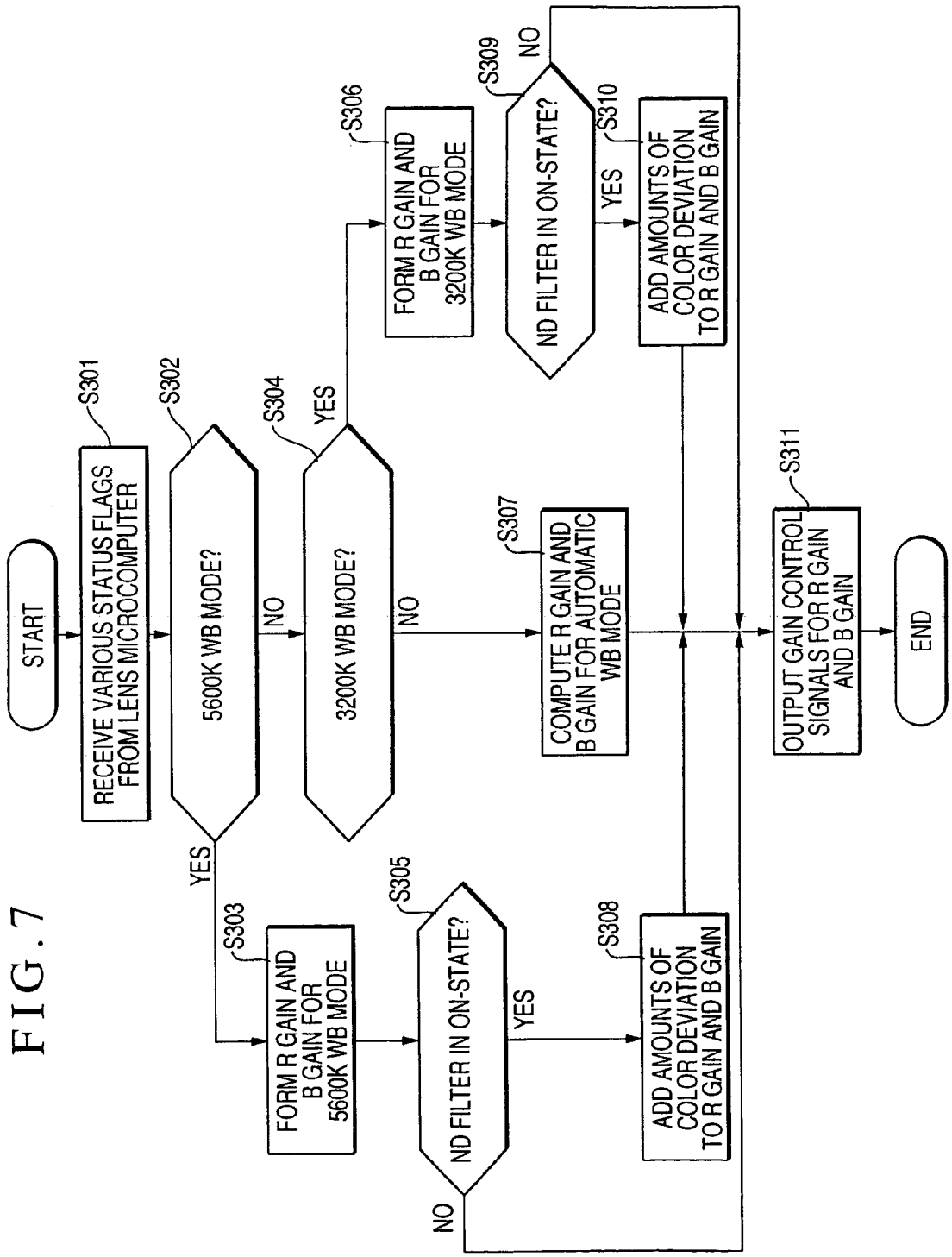
FIG. 7 is a flow chart showing the operation of a camera microcomputer according to the third embodiment of the invention.

Next, referring to FIG. 7, which is a flow chart showing the processing operation of the camera microcomputer 109, the camera microcomputer 109 receives, from the lens microcomputer 111, the status flags obtained in the steps S701 and S704 or in the steps S701 and S703 shown in FIG. 6 (step S301). Then, the camera microcomputer 109 reads the switching state of the WB mode selection switch 115 to make a check to find if the WB (white balance) mode is the 5600K mode (outdoor mode) (step S302). If a result of the check made at step S302 indicates "YES", the camera microcomputer 109 forms gain control signals for R gain and B gain which are beforehand determined correspondingly with the 5600K mode (step S303).

Subsequently, the camera microcomputer 109 makes a check for the status flag indicative of the ON-state or the OFF-state of the ND filter 102 received in step S301 (step S305). If it is found that the ND filter 102 is in the OFF-state, the camera microcomputer 109 outputs the gain control signals for R gain and B gain formed at step S303 to control the gain control signal output circuit 125 (step S311).

On the other hand, if it is found that the ND filter 102 is in the ON-state, the camera microcomputer 109 adds, to the control signals for R gain and B gain formed in step S303, the amounts of offset (the amounts of color deviation) represented by the status flag indicative of the amounts of color deviation received in step S301, so as to form new control signals for R gain and B gain for the purpose of removing color deviation (step S308). Then, the camera microcomputer 109 outputs the gain control signals for R gain and B gain formed at step S308 to control the gain control signal output circuit 125 (step S311).

If the result of the check made at step S302 indicates "NO", the camera microcomputer 109 reads the switching state of the WB mode selection switch 115 to make a check to find if the WB mode is the 3200K mode (indoor mode) (step S304). If a result of the check made at step S304 indicates "YES", the camera microcomputer 109 forms gain control signals for R gain and B gain which are beforehand determined correspondingly with the 3200K mode (step S306).

Subsequently, the camera microcomputer 109 makes a check for the status flag indicative of the ON-state or the OFF-state of the ND filter 102 received in step S301 (step S309). If it is found that the ND filter 102 is in the OFF-state, the camera microcomputer 109 outputs the gain control signals for R gain and B gain formed at step S306 to control the gain control signal output circuit 125 (step S311).

On the other hand, if it is found that the ND filter 102 is in the ON-state, the camera microcomputer 109 adds, to the control signals for R gain and B gain formed in step S306, the amounts of offset (the amounts of color deviation) represented by the status flag indicative of the amounts of color deviation received in step S301, so as to form new control signals for R gain and B gain for the purpose of removing color deviation (step S310). Then, the camera microcomputer 109 outputs the gain control signals for R gain and B gain formed at step S310 to control the gain control signal output circuit 125 (step S311).

If the result of the check made at step S304 indicates "NO", the camera microcomputer 109 judges the WB mode selection switch 115 to be in the automatic mode, and computes gain control values for R gain and B gain for the automatic mode (step S307). Then, the camera microcomputer 109 outputs, to the gain control signal output circuit 125, the gain control values computed at step S307 as gain control signals for R gain and B gain (step S311).

Fourth Embodiment

Figure 8:
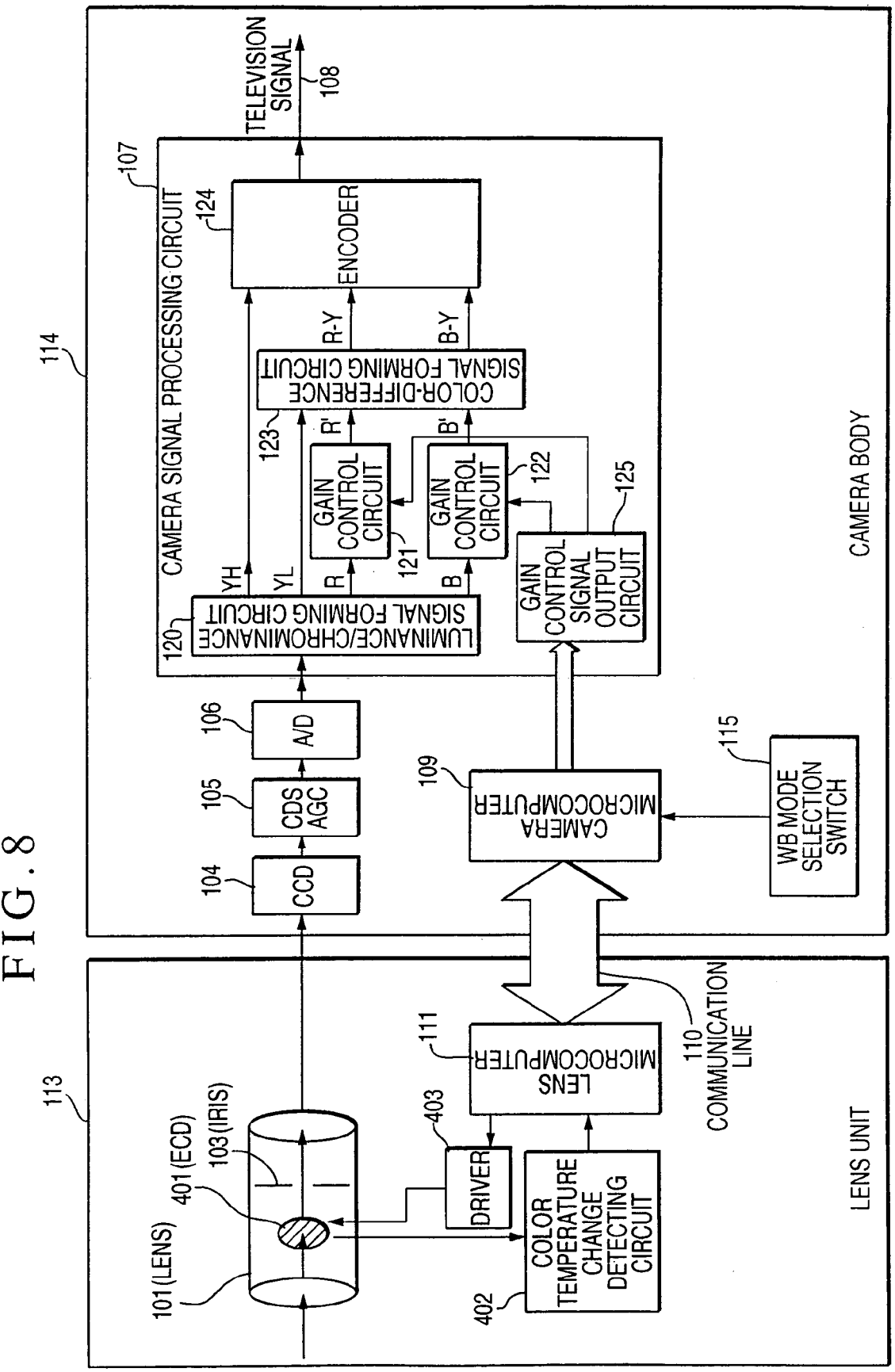
FIG. 8 is a block diagram showing the arrangement of an interchangeable-lens type image pickup system according to a fourth embodiment of the invention.

FIG. 8 is a block diagram showing the arrangement of an interchangeable-lens type image pickup system according to a fourth embodiment of the invention. In FIG. 8, parts corresponding to those shown in FIG. 23 are denoted by the same reference numerals 101 to 115, and the duplicate description thereof is omitted here.

In the following, parts different from those shown in FIG. 23 are mainly described with reference to FIG. 8.

Referring to FIG. 8, the interchangeable-lens type image pickup system according to the fourth embodiment includes, in addition to the parts as mentioned above, an ECD (electrochromic element) 401, which is used in place of the ND filter 102 shown in FIG. 23, a color temperature change detecting circuit 402 for detecting, at all times, a change of color temperature taking place along with a change of the density of the ECD 401, and a driver 403 for changing the density of the ECD 401. The other parts are arranged substantially in the same manner as in FIG. 23.

The operation of the interchangeable-lens type image pickup system according to the fourth embodiment is described with reference to the flow charts of FIGS. 9 and 10.

Figure 9:
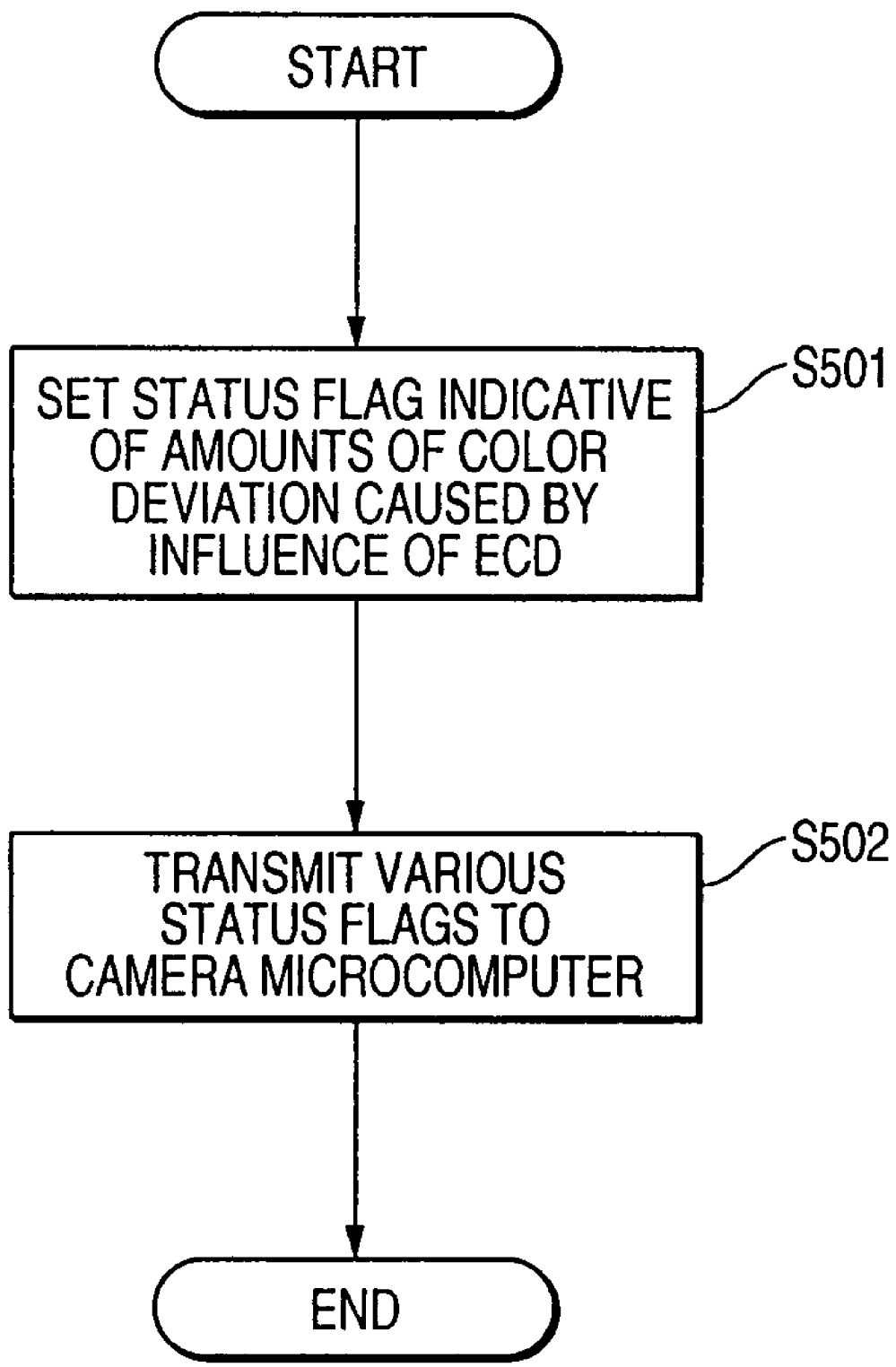
FIG. 9 is a flow chart showing the operation of a lens microcomputer according to the fourth embodiment of the invention.

Referring to FIG. 9, which is a flow chart showing the processing operation of the lens microcomputer 111, the lens microcomputer 111 sets a status flag indicative of the amounts of color deviation caused by the influence of the ECD 401 (step S501). This status flag is set to indicate the amount of change of color temperature taking place at the same time that the density of the ECD 401 is changed, which is detected by the color temperature change detecting circuit 402.

The contents of that status flag are composed of values representing, with burst ratios, the amounts of deviation from the center position of the vector scope, such as the amount of color deviation 1001 in R-Y and the amount of color deviation 1002 in B-Y as shown in FIG. 26(b).

Subsequently, the lens microcomputer 111 transmits the status flag set in step S501 to the camera microcomputer 109 (step S502).

Figure 10:
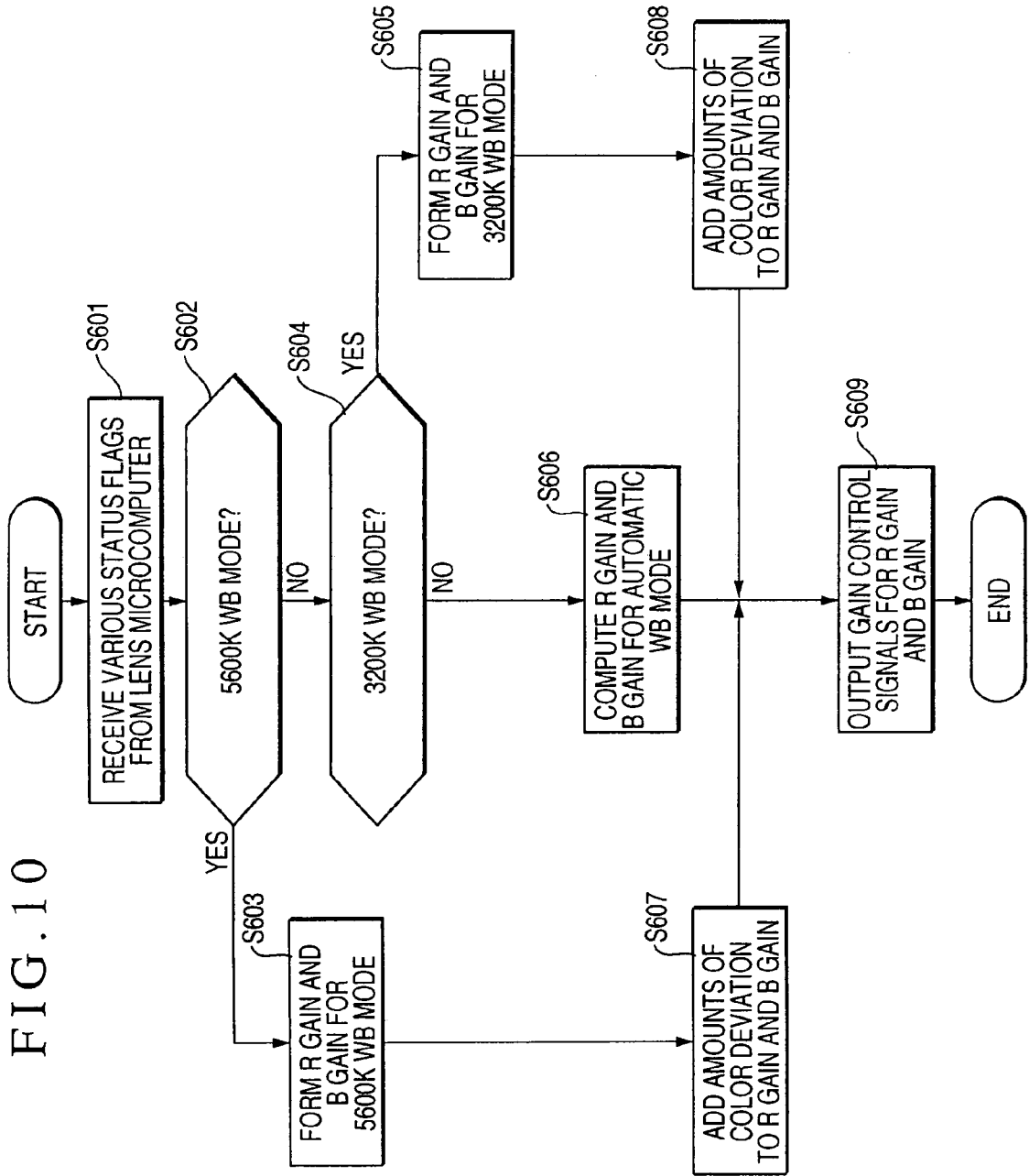
FIG. 10 is a flow chart showing the operation of a camera microcomputer according to the fourth embodiment of the invention.

Referring to FIG. 10, which is a flow chart showing the processing operation of the camera microcomputer 109, the camera microcomputer 109 receives, from the lens microcomputer 111, the status flag set in the step S501 (step S601). Then, the camera microcomputer 109 reads the switching state of the WB mode selection switch 115 to make a check to find if the WB (white balance) mode is the 5600K mode (outdoor mode) (step S602). If a result of the check made at step S602 indicates "YES", the camera microcomputer 109 forms gain control signals for R gain and B gain which are beforehand determined correspondingly with the 5600K mode (step S603).

Subsequently, the camera microcomputer 109 adds, to the control signals for R gain and B gain formed in step S603, the amounts of offset (the amounts of color deviation) represented by the status flag indicative of the amounts of color deviation received in step S601, so as to form new control signals for R gain and B gain for the purpose of removing color deviation (step S607). Then, the camera microcomputer 109 outputs the gain control signals for R gain and B gain formed at step S607 to control the gain control signal output circuit 125 (step S609).

If the result of the check made at step S602 indicates "NO", the camera microcomputer 109 reads the switching state of the WB mode selection switch 115 to make a check to find if the WB mode is the 3200K mode (indoor mode) (step S604). If a result of the check made at step S604 indicates "YES", the camera microcomputer 109 forms gain control signals for R gain and B gain which are beforehand determined correspondingly with the 3200K mode (step S605).

Subsequently, the camera microcomputer 109 adds, to the control signals for R gain and B gain formed in step S605, the amounts of offset (the amounts of color deviation) represented by the status flag indicative of the amounts of color deviation received in step S601, so as to form new control signals for R gain and B gain for the purpose of removing color deviation (step S608). Then, the camera microcomputer 109 outputs the gain control signals for R gain and B gain formed at step S608 to control the gain control signal output circuit 125 (step S609).

If the result of the check made at step S604 indicates "NO", the camera microcomputer 109 judges the WB mode selection switch 115 to be in the automatic mode, and computes gain control values for R gain and B gain for the automatic mode (step S606). Then, the camera microcomputer 109 outputs, to the gain control signal output circuit 125, the gain control values computed at step S606 as gain control signals for R gain and B gain (step S609).

According to the third or fourth embodiment described above, the control operation in the WB mode is performed in accordance with the tinge of the ND filter. Accordingly, even when the ND filter is used, the reproducibility of color is not deteriorated. Further, even in the case of the interchangeable-lens type image pickup system, since information indicative of the tinge of the ND filter is transmitted from the lens unit to the camera body, an appropriate color correction can be performed on the side of the camera body whatever kind of ND filter is used. As a result, the second problem mentioned in the foregoing can be solved.

Fifth Embodiment

Figure 11:
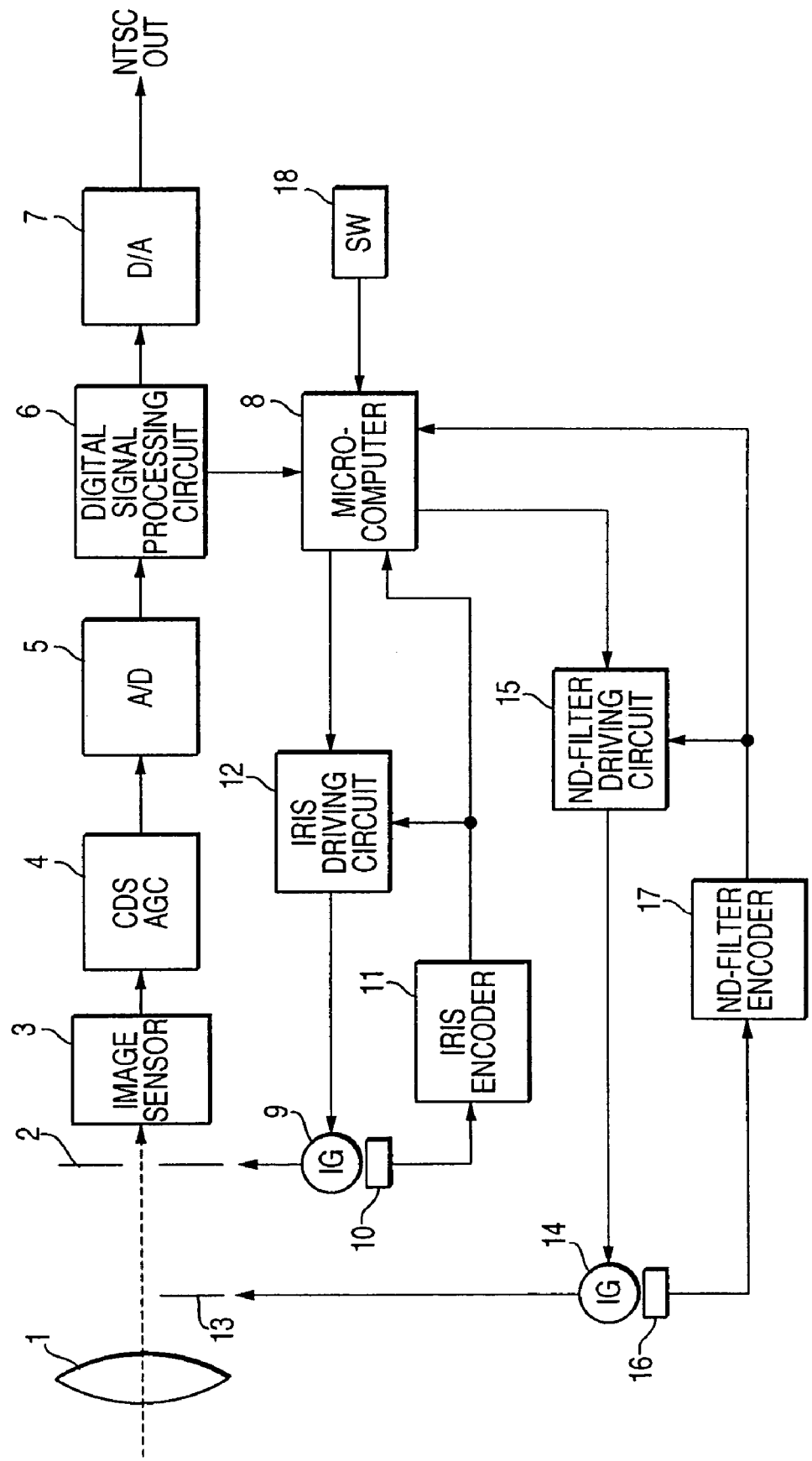
FIG. 11 is a block diagram showing the arrangement of an image pickup apparatus according to a fifth embodiment of the invention.

FIG. 11 is a block diagram showing the arrangement of an image pickup apparatus according to a fifth embodiment of the invention. In FIG. 11, parts corresponding to those shown in FIG. 27 as the third example of prior art are denoted by the same reference numerals 1 to 12, and the duplicate description thereof is omitted here.

Referring to FIG. 11, the image pickup apparatus according to the fifth embodiment includes, in addition to the parts as mentioned above, an ND filter 13, an IG meter 14 for controlling the insertion of the ND filter 13, an ND-filter driving circuit 15, a Hall element 16 for detecting the position of the IG meter 14, an ND-filter encoder 17, and an ND-filter switch 18.

Figure 27:
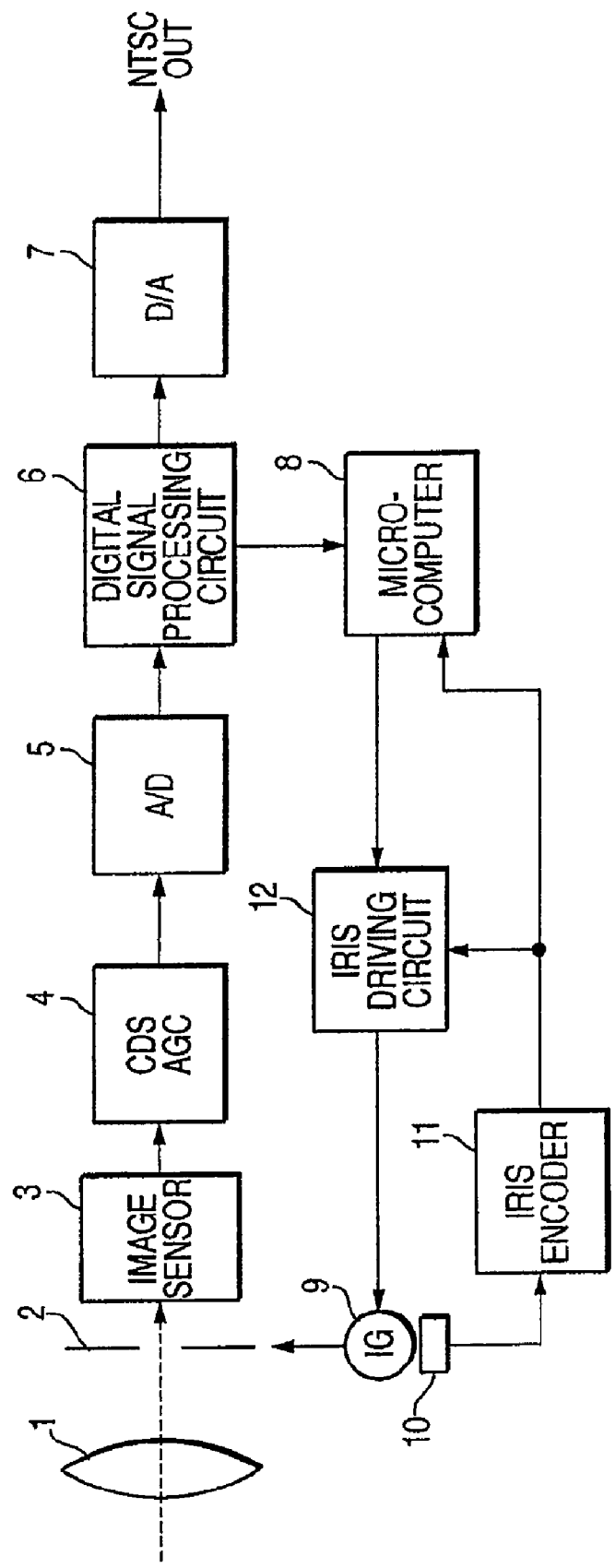
FIG. 27 is a block diagram showing the arrangement of an image pickup apparatus according to a third example of prior art.

As mentioned in the foregoing with reference to FIG. 27, an object image made incident on the image sensor 3 by the photographic lens 1 is photoelectrically converted into an electrical signal by the image sensor 3. The electrical signal is processed by the CDS/AGC circuit 4, the A/D converter 5, the digital signal processing circuit 6, the D/A converter 7, etc., and is externally outputted as a video signal of the NTSC system or the like.

Further, the rotational position of the IG meter 9, which is arranged to drive the iris 2 in the opening direction and in the closing direction, is detected by the Hall element 10. A result of detection of the rotational position of the IG meter 9 is amplified and offset-controlled by the iris encoder 11 and is then taken in the microcomputer 8 as data.

The microcomputer 8 reads information on the video signal level from the digital signal processing circuit 6 and information on the opening-and-closing state of the iris 2 from the iris encoder 11. Then, the microcomputer 8 computes a control signal for the iris 3 and outputs the control signal to the iris driving circuit 12 in such a way as to make the video signal level small if it is too large or in such a way as to make the video signal level large if it is too small. The iris driving circuit 12 drives the IG meter 9 according to the control signal.

In this instance, since the IG meter 9 itself is an inductance element, it has a temporal response lag with respect to an applied voltage. In order to compensate for this lag, the rotational position of the IG meter 9 detected by the Hall element 10 is fed back to the iris driving circuit 12 through the iris encoder 11 to control the rotational speed of the IG meter 9.

Figure 12:
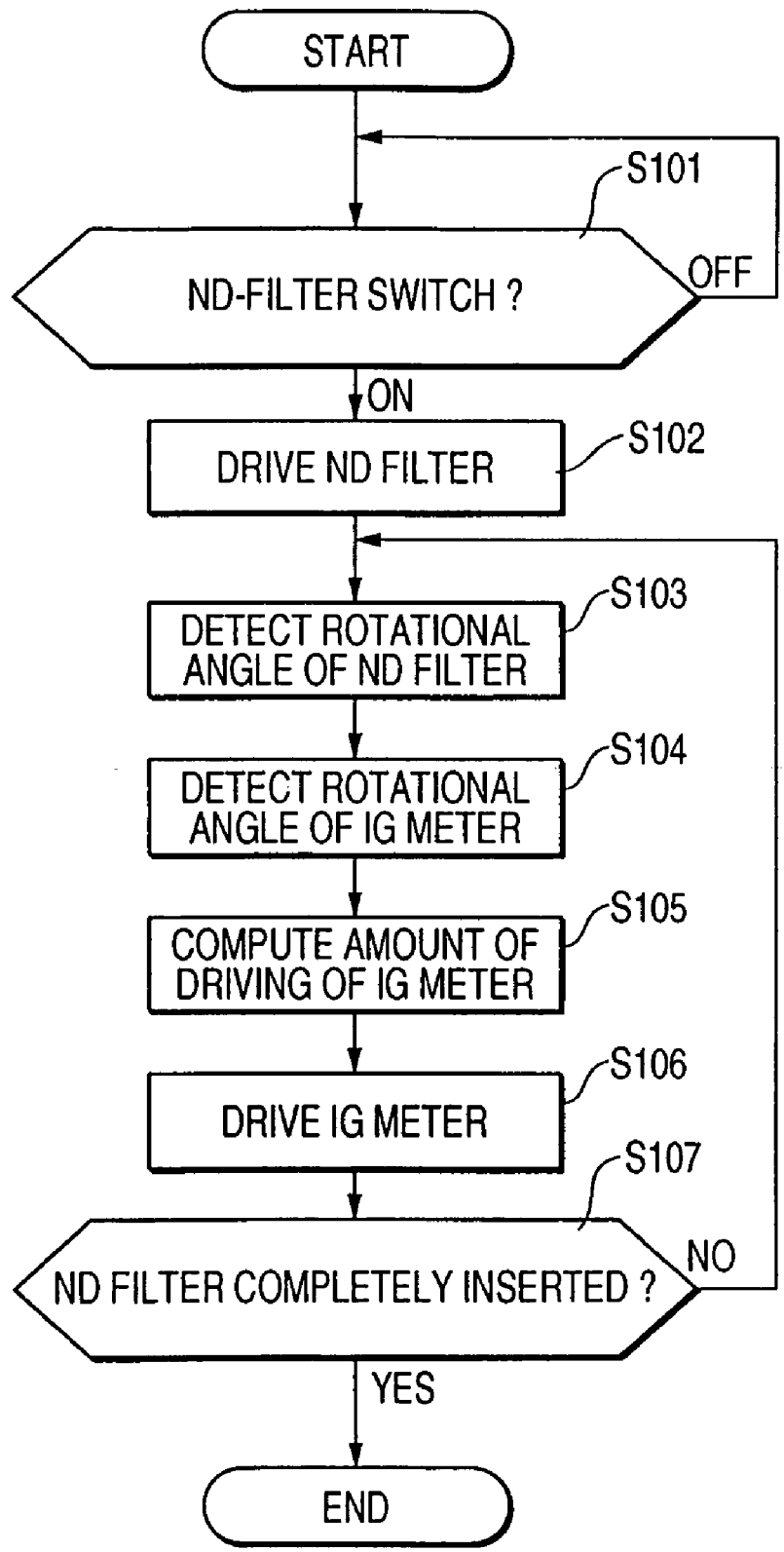
FIG. 12 is a flow chart showing the operation of a microcomputer according to the fifth embodiment of the invention.

Here, when the user judges from the brightness of an object that the ND filter 13 is necessary and operates the ND-filter switch 18, the microcomputer 8 performs the following processing operation according to the flow chart shown in FIG. 12.

Referring to FIG. 12, first, when detecting the operation of the ND-filter switch 18 (step S101), the microcomputer 8 sends to the ND-filter driving circuit 15 a signal for driving the ND filter 13 (step S102). The ND-filter driving circuit 15 supplies an electric current to the IG meter 14, so that the IG meter 14 rotates to insert the ND filter 13 into a space between the photographic lens 1 and the iris 2.

The rotational position of the IG meter 14, which controls the insertion of the ND filter 13, is magnetically detected by the Hall element 16, in a manner similar to the IG meter 9 which drives the iris 2, is amplified and offset-controlled to a suitable level by the ND-filter encoder 17, and is then fed back to the ND-filter driving circuit 15 to control the rotational speed of the IG meter 14. Further, at the same time, a result of detection of the rotational position of the IG meter 14 is taken in the microcomputer 8 as data after A/D conversion through the ND-filter encoder 17 (step S103).

A period of time required until the ND filter 13 is completely inserted into an optical path of the photographic lens 1 after the microcomputer 8 sends a driving signal to the ND-filter driving circuit 15 to start moving the ND filter 13 and a change of the quantity of light taking place during that period of time are uniquely determined by the constant of the ND-filter driving circuit 15 and the characteristics of the IG meter 14 and the Hall element 16.

Figure 13:
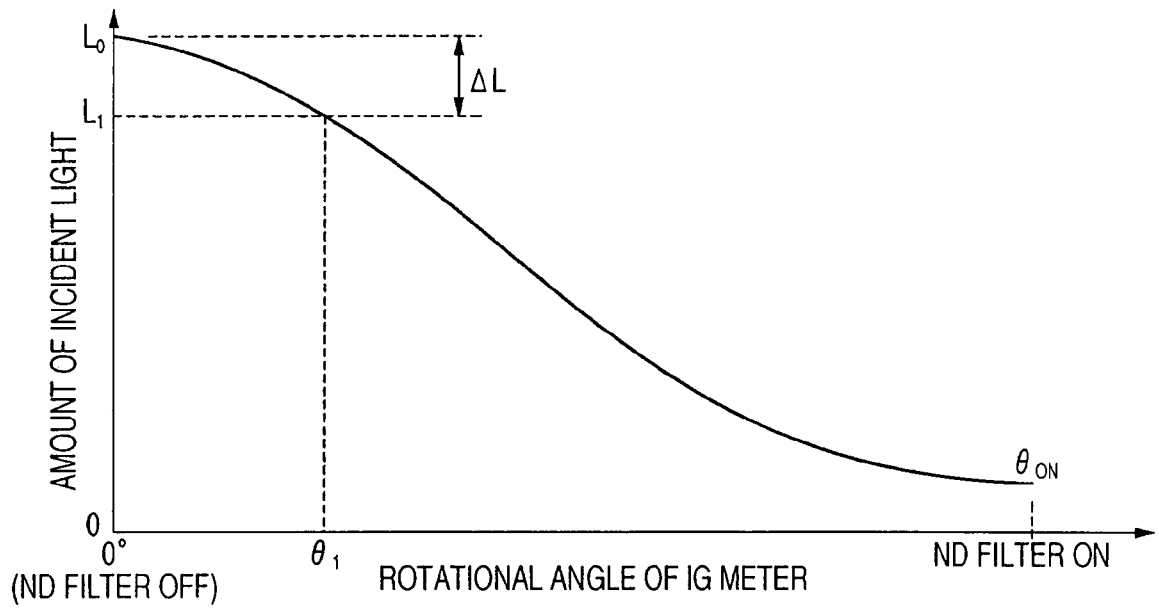
FIG. 13 is a characteristic diagram showing the relation between the rotational angle of an IG meter for driving an ND filter and the variation of the quantity of light.

FIG. 13 shows such a change of the quantity of light, and is a graph showing the relation between the rotational angle of the IG meter 14 and a change of the quantity of light incident from the photographic lens 1 caused by the ND filter 13 being inserted by the rotation of the IG meter 14. The characteristics as shown in FIG. 13 are stored, as data, in the microcomputer 8.

Figure 14:
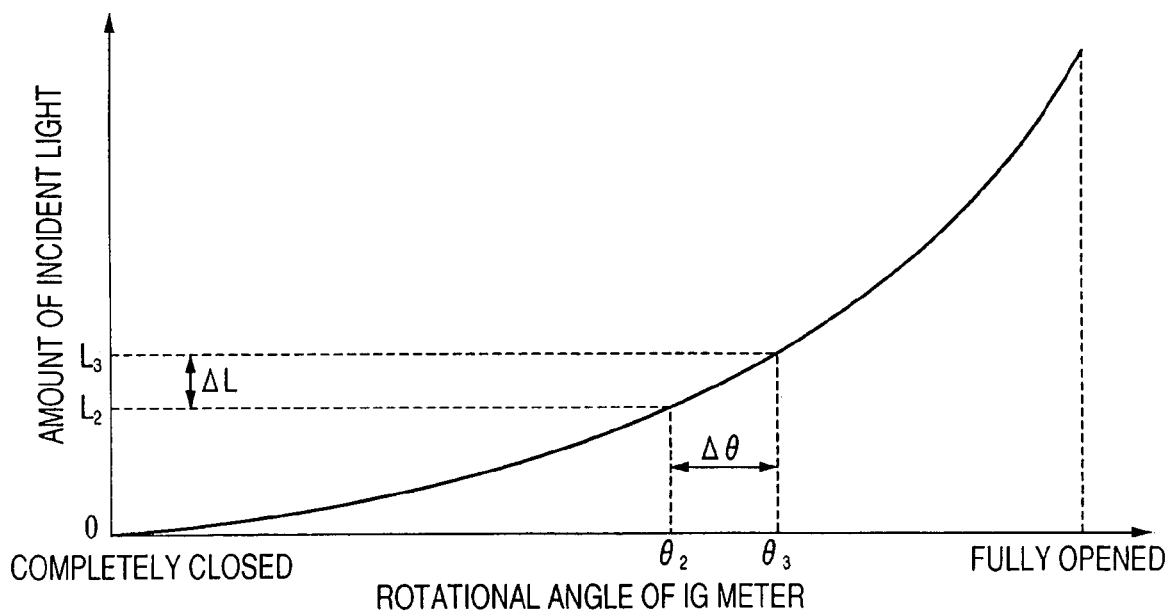
FIG. 14 is a characteristic diagram showing the relation between the rotational angle of an IG meter for driving iris blades and the variation of the quantity of light.

FIG. 14 is a graph showing the relation between the rotational angle of the IG meter 9 and a change of the quantity of light incident from the photographic lens 1 caused by the iris 2 being driven by the rotation of the IG meter 9. The characteristics as shown in FIG. 14 also are stored, as data, in the microcomputer 8.

When the ND filter 13 is not yet inserted, the rotational angle of the IG meter 14 is 0°. In response to the operation of the ND-filter switch 18, the IG meter 14 starts rotating. According to the rotation of the IG meter 14, the ND filter 13 starts covering the optical path of the photographic lens 1 and finally covers the whole thereof.

As shown in FIG. 13, assuming that the quantity of light obtained when the IG meter 14 starts rotating is $L_0$ and the quantity of light obtained when the IG meter 14 has rotated as much as an angle $\theta_1$ is $L_1$, a change of the quantity of light during the period between such two points of time becomes $\Delta L$. The microcomputer 8 reads, through the ND-filter encoder 17, a result of detection of the rotational angle of the IG meter 14 by the Hall element 16, and, in the similar way, reads, through the iris encoder 11, a rotational angle $\theta_2$ of the IG meter 9 obtained at that point of time (step S104). Then, the microcomputer 8 computes, from beforehand-stored data, such a change of rotational angle $\Delta\theta$ of the IG meter 9 as to cancel the change of the quantity of light $\Delta L$ at that point of time (step S105).

The microcomputer 8 causes, on the basis of such a correction value, the iris driving circuit 12 to rotate the IG meter 9 by the angle $\Delta\theta$ so as to the bring the IG meter 9 to a rotational position θ3 (step S106). Accordingly, the quantity of incident light defined by the iris 2 is changed from a value $L_2$ to a value $L_3$ with respect to the change of the quantity of light $\Delta L$ caused by the insertion of the ND filter 13, so that an exposure is appropriately corrected. A series of such actions is repeated at intervals of a predetermined period until the ND filter 13 is completely inserted (step S107).

Sixth Embodiment

Figure 15:
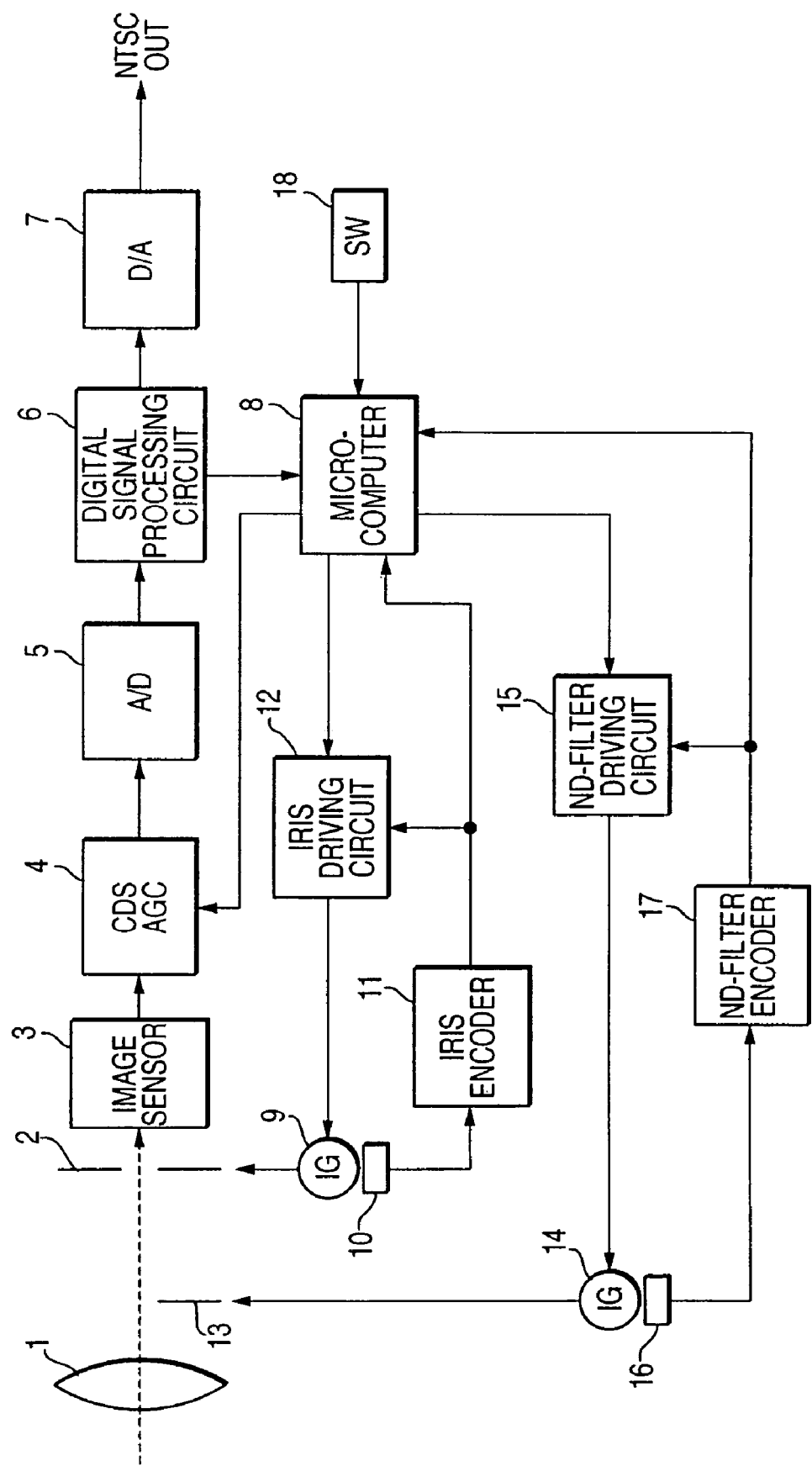
FIG. 15 is a block diagram showing the arrangement of an image pickup apparatus according to a sixth embodiment of the invention.

FIG. 15 is a block diagram showing the arrangement of an image pickup apparatus according to a sixth embodiment of the invention. In FIG. 15, parts corresponding to those shown in FIG. 11 are denoted by the same reference numerals 1 to 18, and the duplicate description thereof is omitted here.

The arrangement shown in FIG. 15 differs from that shown in FIG. 11 in that the microcomputer 8 controls the gain of the CDS/AGC circuit 4.

The process up to the operation in which the iris mechanism composed of the iris 2, the IG meter 9 and the Hall element 10 is operated to make constant the brightness of an object image formed on the image sensor 3 is the same as that described in the fifth embodiment.

Figure 16:
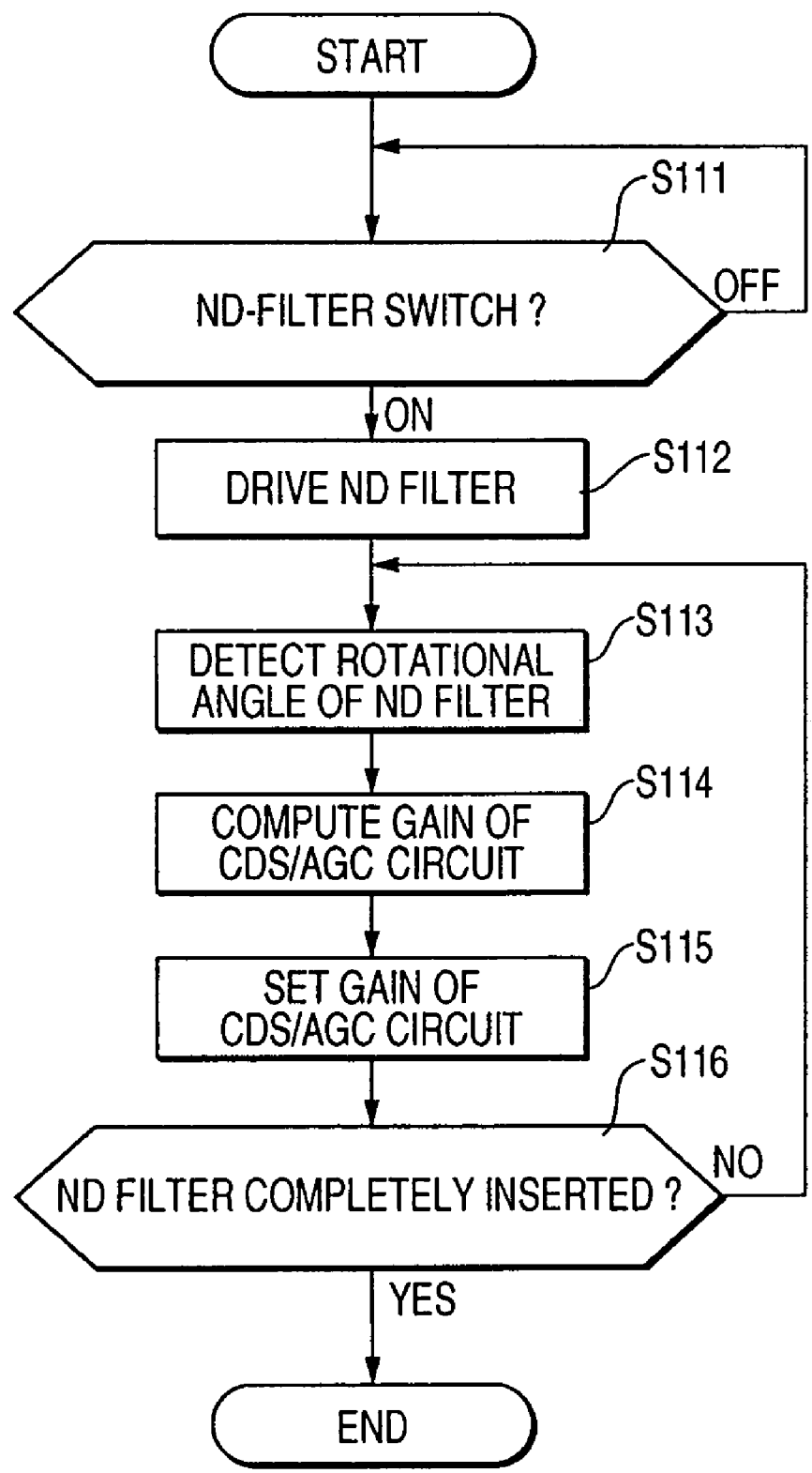
FIG. 16 is a flow chart showing the operation of a microcomputer according to the sixth embodiment of the invention.

When the user judges from the brightness of an object that the ND filter 13 is necessary and operates the ND-filter switch 18, the microcomputer 8 performs the following processing operation according to the flow chart shown in FIG. 16.

Referring to FIG. 16, when detecting the operation of the ND-filter switch 18 (step S111), the microcomputer 8 sends to the ND-filter driving circuit 15 a signal for driving the ND filter 13 (step S112).

The ND-filter driving circuit 15 supplies an electric current to the IG meter 14, so that the IG meter 14 rotates to insert the ND filter 13 into a space between the photographic lens 1 and the iris 2. The rotational speed of the IG meter 14, which controls the insertion of the ND filter 13, is controlled by the ND-filter encoder 17 in a manner similar to that in the fifth embodiment, and a result of detection of the rotational position of the IG meter 14 is taken in the microcomputer 8 as data after A/D conversion (step S113).

The characteristics indicative of changes of the quantity of light occurring until the ND filter 13 is completely inserted into an optical path of the photographic lens 1 after the ND filter 13 starts being moved by the operation of the ND-filter switch 18 are beforehand stored, as data, in the microcomputer 8, similarly to the fifth embodiment.

Referring to FIG. 13, assuming that the quantity of light obtained when the IG meter 14 starts rotating is $L_0$ and the quantity of light obtained when the IG meter 14 has rotated as much as an angle $\theta_1$ is $L_1$, a change of the quantity of light during the period between such two points of time becomes $\Delta L$. The microcomputer 8 reads, through the ND-filter encoder 17, a result of detection of the rotational angle of the IG meter 14 by the Hall element 16, and computes such a gain of the CDS/AGC circuit 4 as to cancel the change of the quantity of light $\Delta L$ (step S114).

The microcomputer 8 controls the gain of the CDS/AGC circuit 4 on the basis of such a correction value (step S115), so as to compensate for a change of the quantity of light caused by the insertion of the ND filter 13 by changing the gain of the CDS/AGC circuit 4. A series of such actions is repeated at intervals of a predetermined period until the ND filter 13 is completely inserted (step S116).

Figure 17:
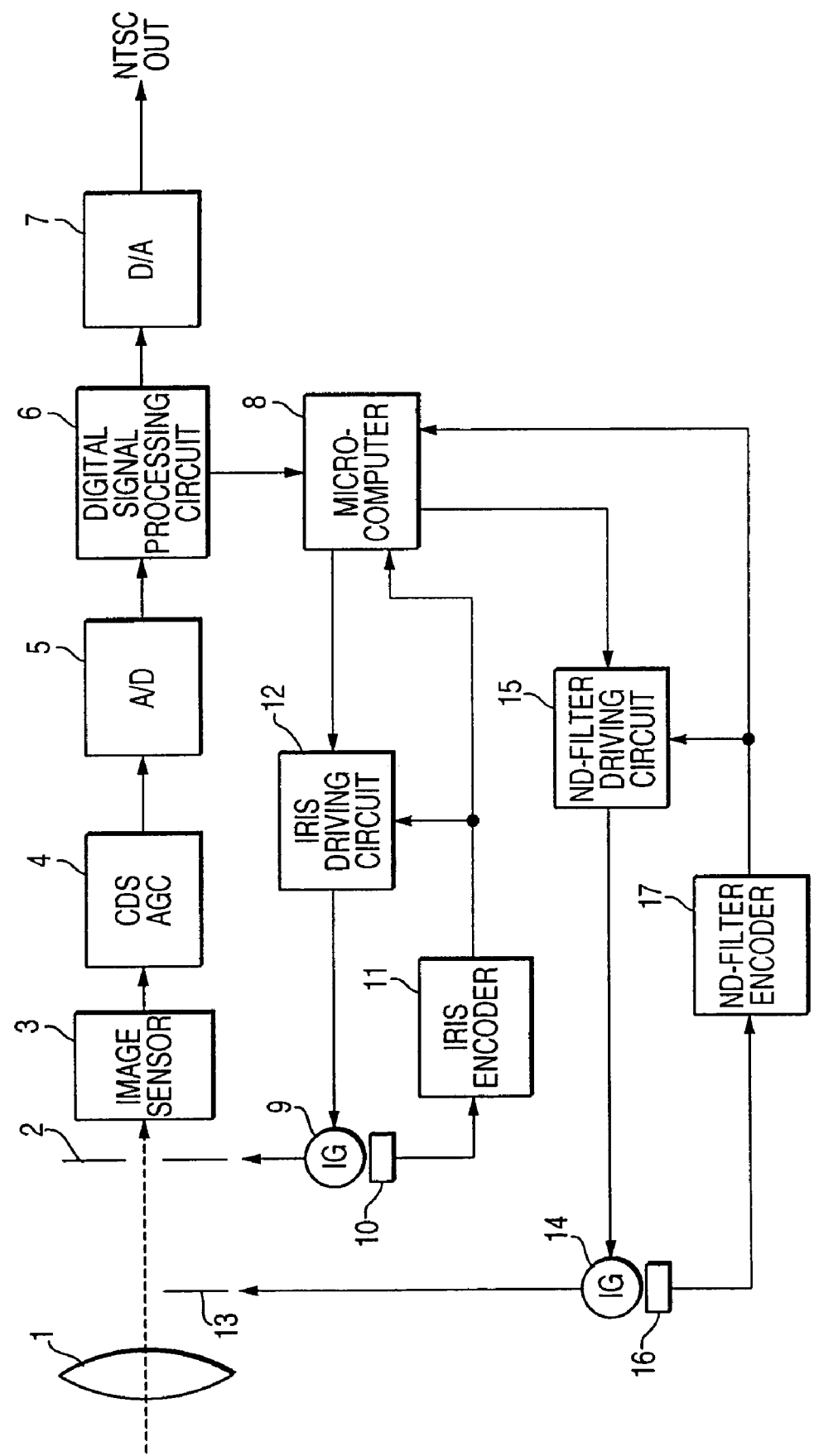
FIG. 17 is a block diagram showing the arrangement of an image pickup apparatus according to a seventh embodiment of the invention.

According to the fifth or sixth embodiment described above, since the variation of a video signal is suppressed to a minimum, it is possible to solve such a problem, described in the third example of prior art shown in FIG. 17, that a picked-up image gives an unnatural feeling to the user when the ND filter is inserted.

Seventh Embodiment

FIG. 17 is a block diagram showing the arrangement of an image pickup apparatus according to a seventh embodiment of the invention. In FIG. 17, parts corresponding to those shown in FIG. 11 are denoted by the same reference numerals 1 to 17, and the duplicate description thereof is omitted here.

The arrangement shown in FIG. 17 differs from that shown in FIG. 11 in that the ND-filter switch 18 is omitted.

The operation of the image pickup apparatus according to the seventh embodiment is described with reference to FIG. 17.

As mentioned in the foregoing, an object image made incident on the image sensor 3 by the photographic lens 1 is photoelectrically converted into an electrical signal by the image sensor 3. The electrical signal is processed by the CDS/AGC circuit 4, the A/D converter 5, the digital signal processing circuit 6, the D/A converter 7, etc., and is externally outputted as a video signal of the NTSC system or the like. Further, the rotational position of the IG meter 9, which is arranged to drive the iris 2 in the opening direction and in the closing direction, is detected by the Hall element 10. A result of detection of the rotational position of the IG meter 9 is taken in the microcomputer 8 as data through the iris encoder 11.

Further, in the above process, the microcomputer 8 reads information on the video signal level and information on the opening-and-closing state of the iris 2. Then, the microcomputer 8 computes a control signal according to the video signal level. The iris driving circuit 12 drives the IG meter 9 according to the control signal. In this instance, since the IG meter 9 itself is an inductance element, it has a temporal response lag with respect to an applied voltage. In order to compensate for this lag, the rotational position of the IG meter 9 detected by the Hall element 10 is fed back to the iris driving circuit 12 through the iris encoder 11 to control the rotational speed of the IG meter 9.

Figure 18:
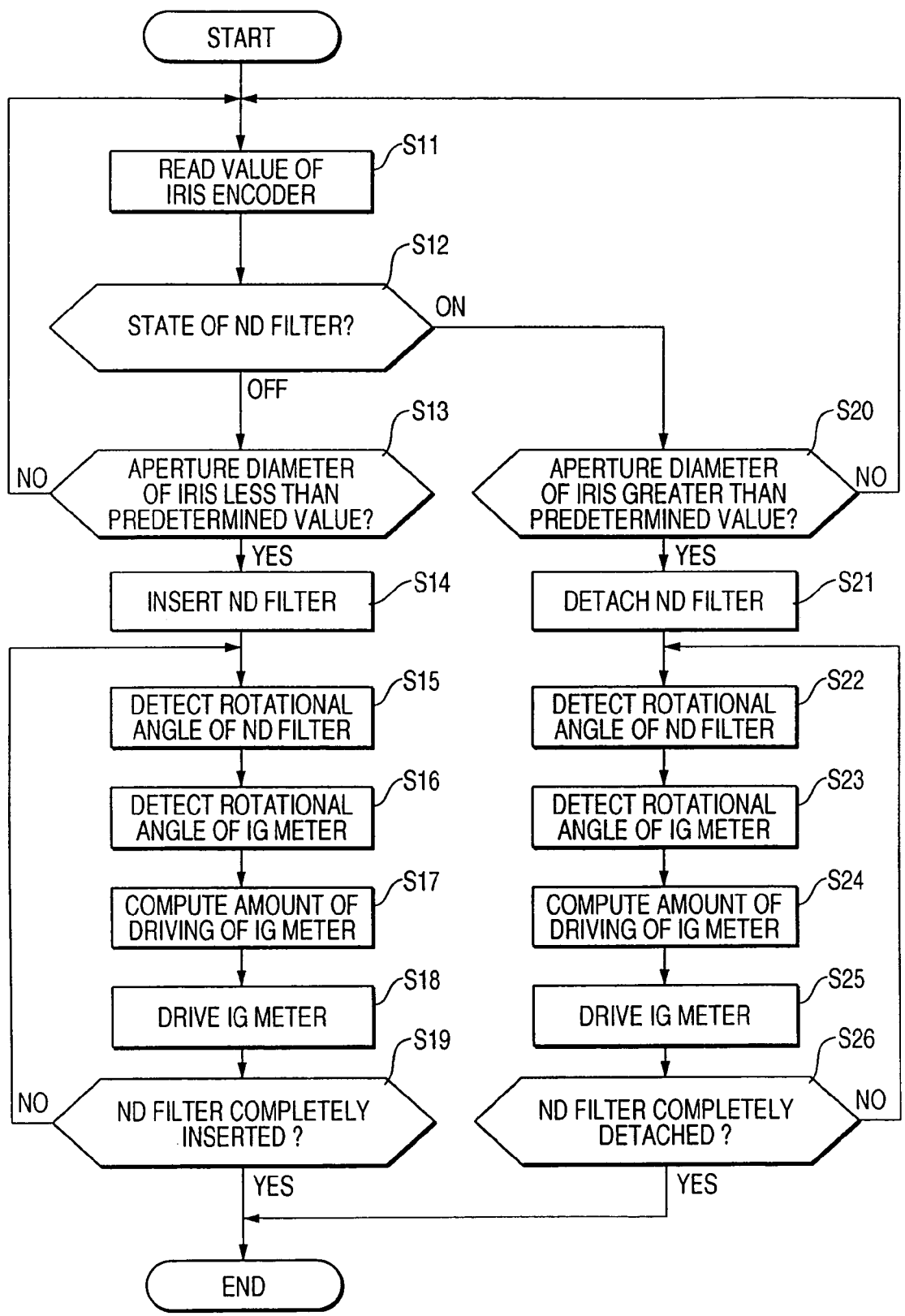
FIG. 18 is a flow chart showing the operation of a microcomputer according to the seventh embodiment of the invention.

FIG. 18 is a flow chart showing the contents of a program to be executed by the microcomputer 8 according to the seventh embodiment.

The microcomputer 8 periodically reads the aperture state of the iris 2 by using the Hall element 10 and the iris encoder 11 (step S11). If, while the ND filter 13 is not inserted, the aperture diameter of the iris 2 becomes less than a predetermined value with the brightness of an object becoming very high (steps S12 and S13), the microcomputer 8 supplies a driving signal to the ND-filter driving circuit 15. Then, the ND-filter driving circuit 15 supplies an electric current to the IG meter 14. The IG meter 14 is then caused to rotate to insert the ND filter 13 into a space between the photographic lens 1 and the iris 2 (step S14).

The rotational position of the IG meter 14, which controls the insertion of the ND filter 13, is magnetically detected by the Hall element 16, in a manner similar to the IG meter 9 which drives the iris 2, is amplified and offset-controlled to a suitable level by the ND-filter encoder 17, and is then fed back to the ND-filter driving circuit 15 to control the rotational speed of the IG meter 14. Further, at the same time, a result of detection of the rotational position of the IG meter 14 is taken in the microcomputer 8 as data after A/D conversion through the ND-filter encoder 17 (step S15).

A period of time required until the ND filter 13 is completely inserted into an optical path of the photographic lens 1 after the ND filter 13 starts moving and a change of the quantity of light taking place during that period of time are uniquely determined by the constant of the ND-filter driving circuit 15 and the characteristics of the IG meter 14 and the Hall element 16.

FIG. 13 shows such a change of the quantity of light, and is a graph showing the relation between the rotational angle of the IG meter 14 and a change of the quantity of light incident from the photographic lens 1 caused by the ND filter 13 being inserted by the rotation of the IG meter 14. The characteristics as shown in FIG. 13 are stored, as data, in the microcomputer 8.

Further, FIG. 14 is a graph showing the relation between the rotational angle of the IG meter 9 and a change of the quantity of light incident from the photographic lens 1 caused by the iris 2 being driven by the rotation of the IG meter 9. The characteristics as shown in FIG. 14 also are stored, as data, in the microcomputer 8.

When the ND filter 13 is not yet inserted, the rotational angle of the IG meter 14 is 0°. When the IG meter 14 starts rotating, the ND filter 13 accordingly starts covering the optical path of the photographic lens 1 and finally covers the whole thereof.

As shown in FIG. 13, assuming that the quantity of light obtained when the IG meter 14 starts rotating is $L_0$ and the quantity of light obtained when the IG meter 14 has rotated as much as an angle $\theta_1$ is $L_1$, a change of the quantity of light during the period between such two points of time becomes $\Delta L$. The microcomputer 8 reads, through the ND-filter encoder 17, a result of detection of the rotational angle of the IG meter 14 by the Hall element 16, and, in the similar way, reads, through the iris encoder 11, a rotational angle $\theta_2$ of the IG meter 9 obtained at that point of time. Then, the microcomputer 8 computes, from beforehand-stored data, such a change of rotational angle $\Delta \theta$ of the IG meter 9 as to cancel the change of the quantity of light $\Delta L$ at that point of time.

The microcomputer 8 causes, on the basis of such a correction value, the iris driving circuit 12 to rotate the IG meter 9 by the angle $\Delta \theta$ so as to compensate for a change of the quantity of light caused by the insertion of the ND filter 13 by changing the aperture diameter of the iris 2. A series of such actions is repeated at intervals of a predetermined period until the ND filter 13 is completely inserted (steps S15 to S19).

On the other hand, if the aperture diameter of the iris 2 becomes greater than the predetermined value with the brightness of an object becoming low, the microcomputer 8 judges that the ND filter 13 is unnecessary, and supplies to the ND-filter driving circuit 15 a signal for detaching the ND filter 13. Then, the ND-filter driving circuit 15 reduces an electric current to be supplied to the IG meter 14. The IG meter 14 is then caused to rotate reversely so as to detach the ND filter 13 from the space between the photographic lens 1 and the iris 2 (steps S20 and S21).

A period of time required until the ND filter 13 is completely detached from the optical path of the photographic lens 1 after the ND filter 13 starts being detached and a change of the quantity of light taking place during that period of time are uniquely determined, as in the event of the insertion of the ND filter 13, by the constant of the ND-filter driving circuit 15 and the characteristics of the IG meter 14 and the Hall element 16, and the characteristic shown in FIG. 13 applies as it is. Thus, this time, conversely, the ND filter 13 takes the locus from the ON-state to the OFF-state.

When the ND filter 13 is in the completely-inserted state, the rotational angle of the IG meter 14 is $\theta_{ON}$. When the IG meter 14 starts rotating in the direction reverse to the direction used for the insertion of the ND filter 13, the ND filter 13 accordingly starts being detached, and is finally detached completely.

The microcomputer 8 computes, in a manner similar to that in the event of the insertion of the ND filter 13, such a change of rotational angle of the IG meter 9 as to cancel a change of the quantity of light caused by the movement of the IG meter 14. Then, the microcomputer 8 causes, on the basis of such a correction value, the iris driving circuit 12 to rotate the IG meter 9 by the angle corresponding to the correction value so as to compensate for a change of the quantity of light caused by the detachment of the ND filter 13 by changing the aperture diameter of the iris 2. A series of such actions is repeated at intervals of a predetermined period until the ND filter 13 is completely detached (steps S22 to S26).

Eighth Embodiment

Figure 19:
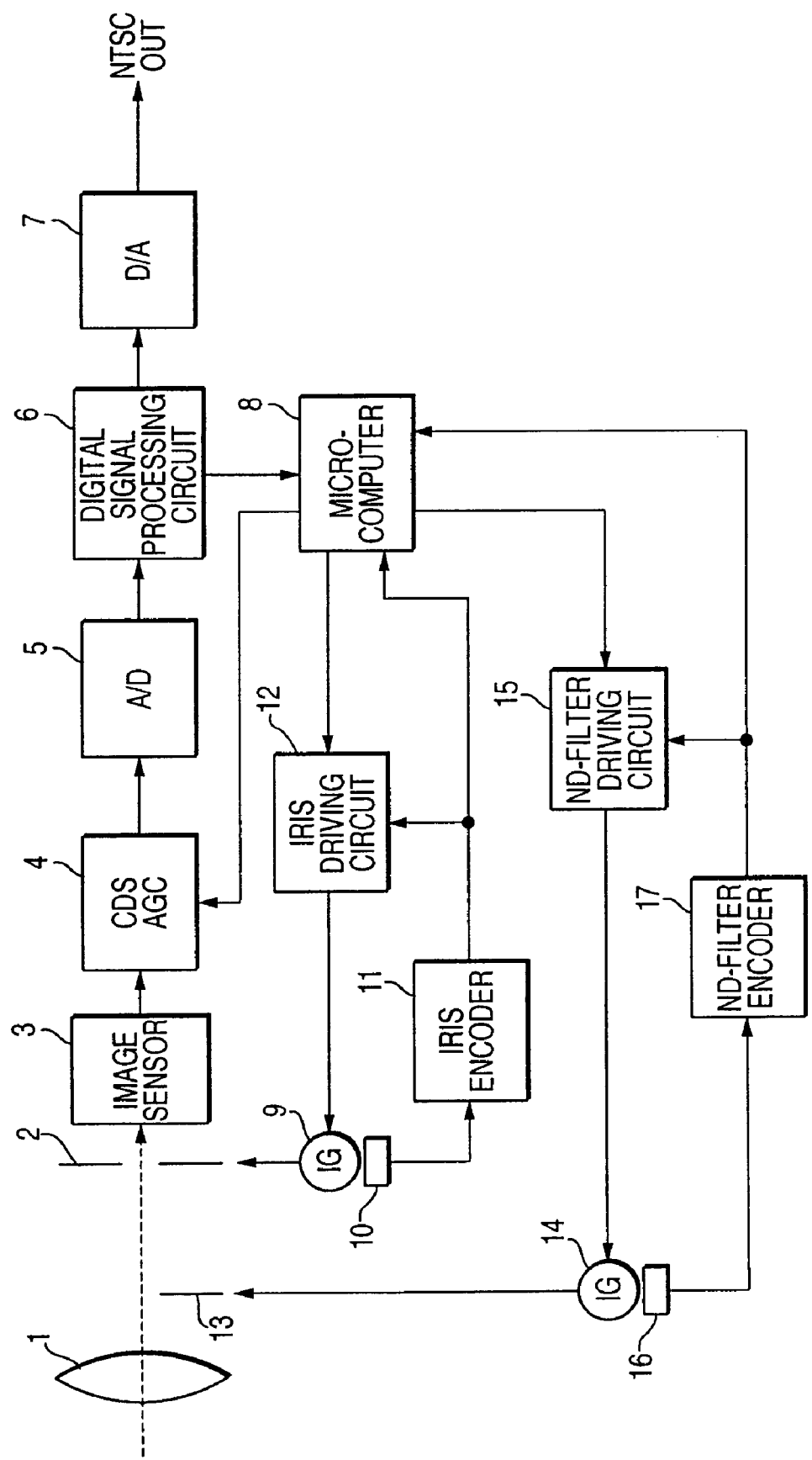
FIG. 19 is a block diagram showing the arrangement of an image pickup apparatus according to an eighth embodiment of the invention.

FIG. 19 is a block diagram showing the arrangement of an image pickup apparatus according to an eighth embodiment of the invention. In FIG. 19, parts corresponding to those shown in FIG. 17 are denoted by the same reference numerals 1 to 17, and the duplicate description thereof is omitted here.

The arrangement shown in FIG. 19 differs from that shown in FIG. 17 in that the microcomputer 8 controls the gain of the CDS/AGC circuit 4.

The process up to the operation in which the iris mechanism composed of the iris 2, the IG meter 9 and the Hall element 10 is operated to make constant the brightness of an object image formed on the image sensor 3 is the same as that described in the seventh embodiment.

Figure 20:
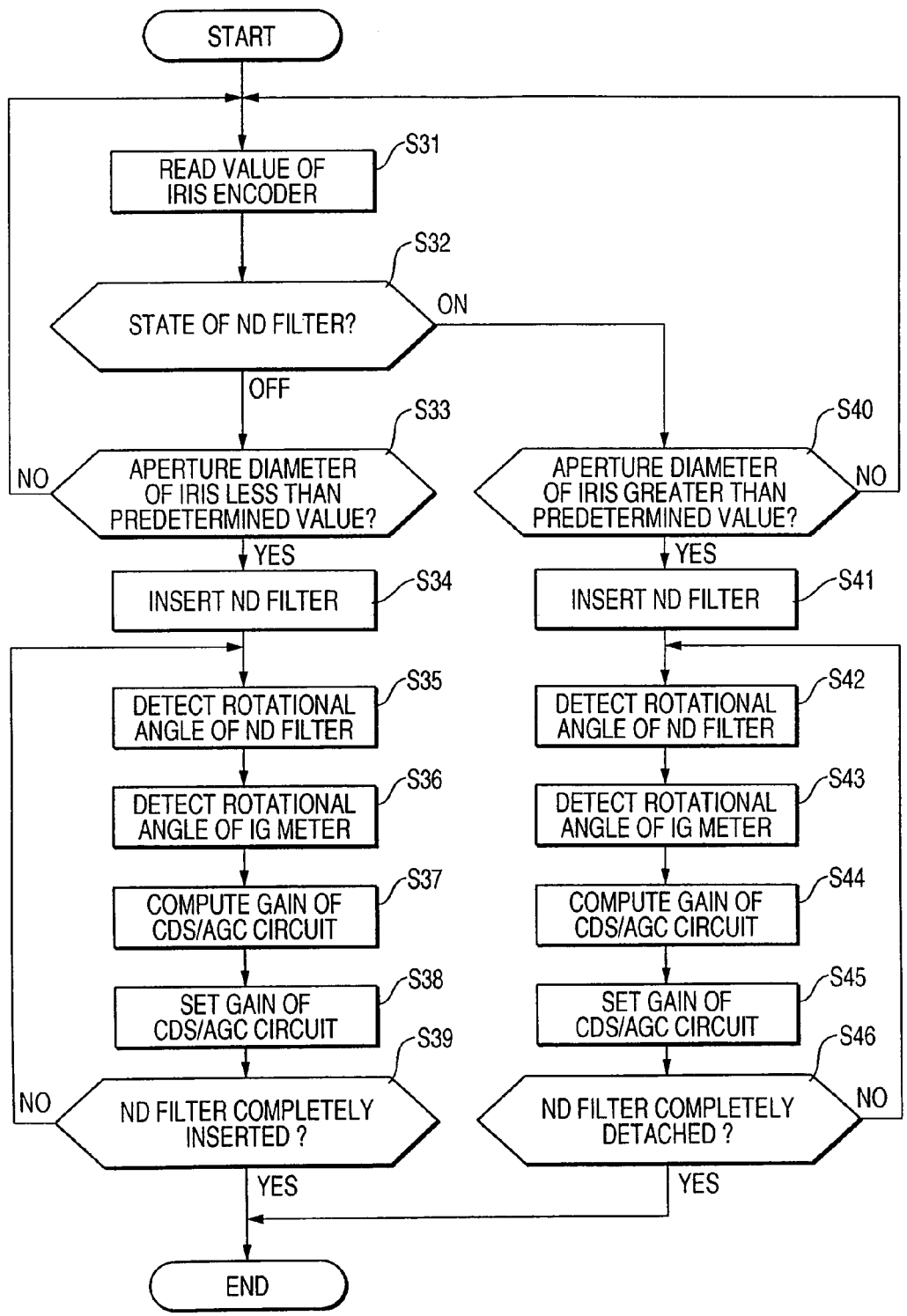
FIG. 20 is a flow chart showing the operation of a microcomputer according to the eighth embodiment of the invention.

FIG. 20 is a flow chart showing the contents of a program to be executed by the microcomputer 8 according to the eighth embodiment.

The microcomputer 8 periodically reads the aperture state of the iris 2 by using the Hall element 10 and the iris encoder 11 (step S31). If, while the ND filter 13 is not inserted, the aperture diameter of the iris 2 becomes less than a predetermined value with the brightness of an object becoming very high, the microcomputer 8 supplies a driving signal to the ND-filter driving circuit 15 (steps S32 to S34). Then, the ND-filter driving circuit 15 supplies an electric current to the IG meter 14. The IG meter 14 is then caused to rotate to insert the ND filter 13 into a space between the photographic lens 1 and the iris 2.

The rotational speed of the IG meter 14, which controls the insertion of the ND filter 13, is controlled by the ND-filter encoder 17 similarly to the seventh embodiment. Further, a result of detection of the rotational position of the IG meter 14 is taken in the microcomputer 8 as data after A/D conversion through the ND-filter encoder 17.

The characteristic of a change of the quantity of light taking place until the ND filter 13 is completely inserted into an optical path of the photographic lens 1 after the ND filter 13 starts moving is beforehand stored in the microcomputer 8 as data, similarly to the seventh embodiment. The microcomputer 8 reads, through the ND-filter encoder 17, a result of detection of the rotational angle of the IG meter 14 by the Hall element 16, and computes such a gain of the CDS/AGC circuit 4 as to cancel the change of the quantity of light $\Delta L$ shown in FIG. 13.

The microcomputer 8 controls the gain of the CDS/AGC circuit 4 on the basis of such a correction value, so as to compensate for a change of the quantity of light caused by the insertion of the ND filter 13 by changing the gain of the CDS/AGC circuit 4. A series of such actions is repeated at intervals of a predetermined period until the ND filter 13 is completely inserted (steps S35 to S39).

On the other hand, if the aperture diameter of the iris 2 becomes greater than the predetermined value with the brightness of an object becoming low, the microcomputer 8 judges that the ND filter 13 is unnecessary, and supplies to the ND-filter driving circuit 15 a signal for detaching the ND filter 13 (steps S40 and S41). Then, the ND-filter driving circuit 15 reduces an electric current to be supplied to the IG meter 14. The IG meter 14 is then caused to rotate reversely so as to detach the ND filter 13 from the space between the photographic lens 1 and the iris 2.

A period of time required until the ND filter 13 is completely detached from the optical path of the photographic lens 1 after the ND filter 13 starts being detached and a change of the quantity of light taking place during that period of time are uniquely determined, as in the event of the insertion of the ND filter 13, by the constant of the ND-filter driving circuit 15 and the characteristics of the IG meter 14 and the Hall element 16, and the characteristic shown in FIG. 13 applies as it is. Thus, this time, conversely, the ND filter 13 takes the locus from the ON-state to the OFF-state.

When the ND filter 13 is in the completely-inserted state, the rotational angle of the IG meter 14 is $\theta_{ON}$. When the IG meter 14 starts rotating in the direction reverse to the direction used for the insertion of the ND filter 13, the ND filter 13 accordingly starts being detached from the optical path of the photographic lens 1, and is finally detached completely. The microcomputer 8 computes, in a manner similar to that in the event of the insertion of the ND filter 13, such a gain of the CDS/AGC circuit 4 as to cancel a change of the quantity of light caused by the movement of the IG meter 14.

The microcomputer 8 controls the gain of the CDS/AGC circuit 4 on the basis of such a correction value, so as to compensate for a change of the quantity of light caused by the detachment of the ND filter 13 by changing the gain of the CDS/AGC circuit 4. A series of such actions is repeated at intervals of a predetermined period until the ND filter 13 is completely detached from the optical path of the photographic lens 1 (steps S42 to S46).

According to the seventh or eighth embodiment described above, the ND filter is automatically inserted and detached according to the brightness of an object, i.e., an aperture value of the iris. Accordingly, it is not necessary for the user to pay attention to the brightness of an object or to operate the ND-filter switching lever or the ND-filter switch, so that the third problem mentioned in the foregoing can be solved.

Further, since the iris or the gain is controlled according to the automatic insertion and detachment of the ND filter, the variation of a video signal can be suppressed to a minimum.

Ninth Embodiment

Next, a storage medium according to a ninth embodiment of the invention is described.

While a system according to each of the above-described first to eighth embodiments can be composed of the hardware, it may be composed of a computer system using a camera microcomputer, a lens microcomputer or the like having a CPU and a memory. If the system is composed of the computer system, the memory included in each microcomputer constitutes a storage medium according to the invention. In the storage medium, there is stored a program for executing the operation and processing described in each of the flow charts according to the above-described first to eighth embodiments.

Further, as the storage medium, there may be used a semiconductor memory, such as a ROM or a RAM, an optical disk, a magneto-optical disk, a magnetic storage medium or the like, or these media may be used in the form of a CD-ROM, an FD, a magnetic card, a magnetic tape, a nonvolatile memory card or the like.

Accordingly, the same function and the same advantageous effect as that in each of the above-described embodiments can be realized and obtained to attain the object of the invention by using the above storage medium in a system or apparatus other than that described in each of the above-described embodiments and causing the system or apparatus to read and execute program codes stored in the storage medium.

Further, the same function and the same advantageous effect as those in each of the above-described embodiments can be realized and obtained to attain the object of the invention even in a case where an OS (operating system) or the like operating on a computer is arranged to execute actual processes in part or in their entirety, or even in a case where the program codes read out from the storage medium are written into a memory which is disposed within a function extending board inserted in the computer or a function extending unit connected to the computer, and, after that, actual processes are executed, either in part or in their entirety, on the basis of instructions of the program codes by a CPU or the like disposed in the function extending board or the function extending unit.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The software arrangement and the hardware arrangement in each of the embodiments described above are interchangeable as desired.

The invention may be carried out by combining as necessary the embodiments or their technological elements described in the foregoing.

The invention applies to cases where either the whole or a part of claims or the arrangement of each embodiment described forms one apparatus or is used in combination with some other apparatuses or as a component element of an apparatus.

Further, the invention is applicable to cameras of varied kinds, including an electronic camera, such as a video camera, capable of picking up a moving image or a still image, a silver-halide camera, a single-lens reflex camera and a lens-shutter camera using a photographic film, a surveillance camera, etc., and is also applicable to an image pickup apparatus other than cameras, an image reading apparatus, an optical apparatus, and other apparatuses. Further, the invention is applicable to devices adapted for a camera, an image pickup apparatus, an image reading apparatus, an optical apparatuses, and the other apparatuses, component elements forming such apparatuses or devices, methods for controlling these apparatuses and devices, and computer program products providing such control methods.

What is claimed is:

1. An apparatus comprising:
   (A) an ND filter which is made to be capable of being inserted into or detached from an optical path, and limits incident light in a case of existing on the optical path; and
   (B) a light receiving sensor which receives the incident light;
   (C) a determining circuit which determines whether or not the ND filter exists on the optical path; and
   (D) a controller which, on the basis of an output signal corresponding to the determination result of the determining circuit controls a gain of output of said light receiving sensor at a first speed in a case that said ND filter is being inserted into the optical path or is being detached from the optical path, and controls said gain at a second speed slower than the first speed in a case that said ND filter is on the optical path or is out of the optical path.

2. An apparatus according to claim 1, wherein said apparatus includes an image pickup apparatus.

3. An apparatus according to claim 1, wherein said apparatus includes an optical apparatus.

* * * * *